United States Patent
Clark et al.

(10) Patent No.: US 7,448,184 B2
(45) Date of Patent: Nov. 11, 2008

(54) METHOD FOR FORMING A LAMINATE ASSEMBLY WITH AN ULTRASONIC WELDER

(75) Inventors: Verna Lo Clark, Raleigh, NC (US); Michael Mary Van Oort, Durham, NC (US); Richard Ian Walker, Ware (GB)

(73) Assignee: Glaxo Group Limited, Greenford, Middlesex (GB)

( * ) Notice: Subject to any disclaimer, the term of this patent is extended or adjusted under 35 U.S.C. 154(b) by 436 days.

(21) Appl. No.: 10/508,396

(22) PCT Filed: Mar. 25, 2003

(86) PCT No.: PCT/US03/09050

§ 371 (c)(1),
(2), (4) Date: Sep. 21, 2004

(87) PCT Pub. No.: WO03/095332

PCT Pub. Date: Nov. 20, 2003

(65) Prior Publication Data

US 2005/0103678 A1 May 19, 2005

Related U.S. Application Data

(60) Provisional application No. 60/368,107, filed on Mar. 26, 2002.

(51) Int. Cl.
B65B 51/22 (2006.01)
B29C 65/08 (2006.01)
(52) U.S. Cl. .............. 53/453; 53/478; 53/559; 53/329.2; 53/374.4; 156/69; 156/73.3; 206/534.1
(58) Field of Classification Search ................ 53/453, 53/477, 478, 485, 559, 561, 329.2–329.5, 53/374.3–374.6, 281; 156/73.3, 69; 206/534.1, 206/538, 539
See application file for complete search history.

(56) References Cited

U.S. PATENT DOCUMENTS

| | | | | |
|---|---|---|---|---|
| 3,039,246 A | * | 6/1962 | David .......................... | 53/453 |
| 3,189,505 A | * | 6/1965 | Jensen et al. .................. | 53/453 |
| 3,331,495 A | | 7/1967 | Leckzik et al. | |
| 3,523,397 A | * | 8/1970 | Carey et al. ................... | 53/453 |
| 3,651,615 A | * | 3/1972 | Bohner et al. .............. | 156/73.3 |
| 3,750,362 A | * | 8/1973 | Kishpaugh et al. ............ | 53/453 |
| 3,937,645 A | * | 2/1976 | Ascoli et al. ............... | 53/329.3 |

(Continued)

FOREIGN PATENT DOCUMENTS

GB 952581 3/1964

(Continued)

OTHER PUBLICATIONS

European Search Report dated Apr. 10, 2008.

*Primary Examiner*—Stephen F Gerrity
(74) *Attorney, Agent, or Firm*—James P. Riek

(57) ABSTRACT

A laminate assembly, comprising a base sheet having at least one blister formed therein, a pharmaceutical composition displaced in the blister, a lid sheet bonded to the base sheet to form a primary seal therebetween, thus forming a primarily sealed laminate assembly; the primary sealed laminate assembly having a secondary seal formed therein, and related manufacturing method and system of manufacture.

25 Claims, 11 Drawing Sheets

U.S. PATENT DOCUMENTS

| | | | |
|---|---|---|---|
| 4,015,717 A | | 4/1977 | Richardson et al. |
| 4,384,441 A | * | 5/1983 | Maruyama et al. ............ 53/553 |
| 4,490,963 A | * | 1/1985 | Knudsen ....................... 53/559 |
| 4,537,312 A | | 8/1985 | Intini |
| 4,627,432 A | | 12/1986 | Newell et al. |
| 4,689,099 A | * | 8/1987 | Ito et al. ........................ 156/69 |
| 4,693,771 A | * | 9/1987 | Payet et al. ................. 156/73.3 |
| 4,734,142 A | | 3/1988 | Creswell |
| 4,767,492 A | | 8/1988 | Fukusima et al. |
| 4,778,054 A | | 10/1988 | Newell et al. |
| D299,066 S | | 12/1988 | Newell et al. |
| 4,811,731 A | | 3/1989 | Newell et al. |
| 4,866,914 A | | 9/1989 | Moribe |
| 4,870,800 A | * | 10/1989 | Kasai ........................... 156/69 |
| 4,875,329 A | | 10/1989 | Miselli |
| 4,911,304 A | | 3/1990 | Bunin |
| 4,951,444 A | * | 8/1990 | Epstein et al. ................ 53/559 |
| 5,157,901 A | * | 10/1992 | Okamoto et al. .............. 53/478 |
| 5,187,921 A | | 2/1993 | Wilson et al. |
| D342,994 S | | 1/1994 | Rand et al. |
| 5,316,603 A | * | 5/1994 | Akazawa et al. ............... 156/69 |
| 5,331,791 A | * | 7/1994 | Fux et al. ....................... 53/478 |
| 5,345,747 A | * | 9/1994 | Raque et al. ................... 53/478 |
| 5,379,572 A | * | 1/1995 | Giovannone ................. 53/478 |
| 5,447,736 A | * | 9/1995 | Gorlich ...................... 53/329.5 |
| 5,590,654 A | | 1/1997 | Prince |
| 5,613,349 A | | 3/1997 | Brown |
| 5,623,810 A | * | 4/1997 | Dey et al. ...................... 53/453 |
| 5,732,529 A | * | 3/1998 | Dey et al. ...................... 53/559 |
| 5,860,419 A | | 1/1999 | Davies et al. |
| 5,873,360 A | | 2/1999 | Davies et al. |
| 6,021,625 A | * | 2/2000 | Cerwin et al. ................. 53/453 |
| 6,032,666 A | | 3/2000 | Davies et al. |
| 6,091,054 A | * | 7/2000 | Mihalov et al. ............... 53/477 |
| 6,820,401 B2 | * | 11/2004 | Behnke ...................... 53/478 |

FOREIGN PATENT DOCUMENTS

| | | |
|---|---|---|
| GB | 2248796 | 4/1992 |

* cited by examiner

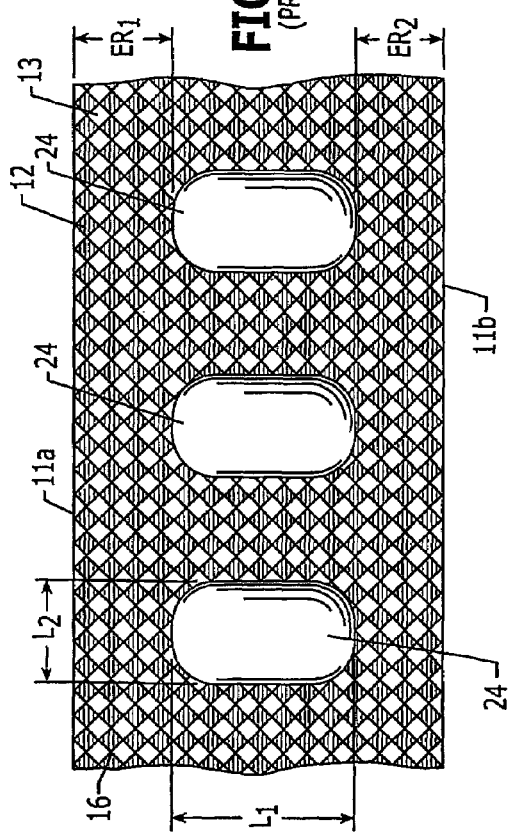
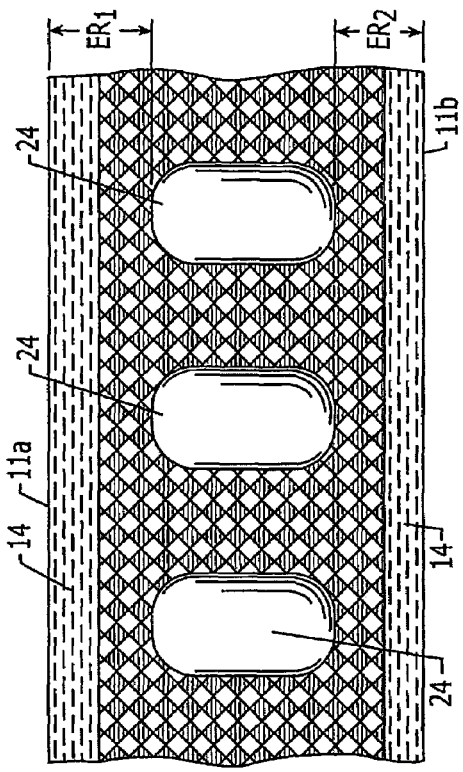
FIGURE 2 (PRIOR ART)
FIGURE 3

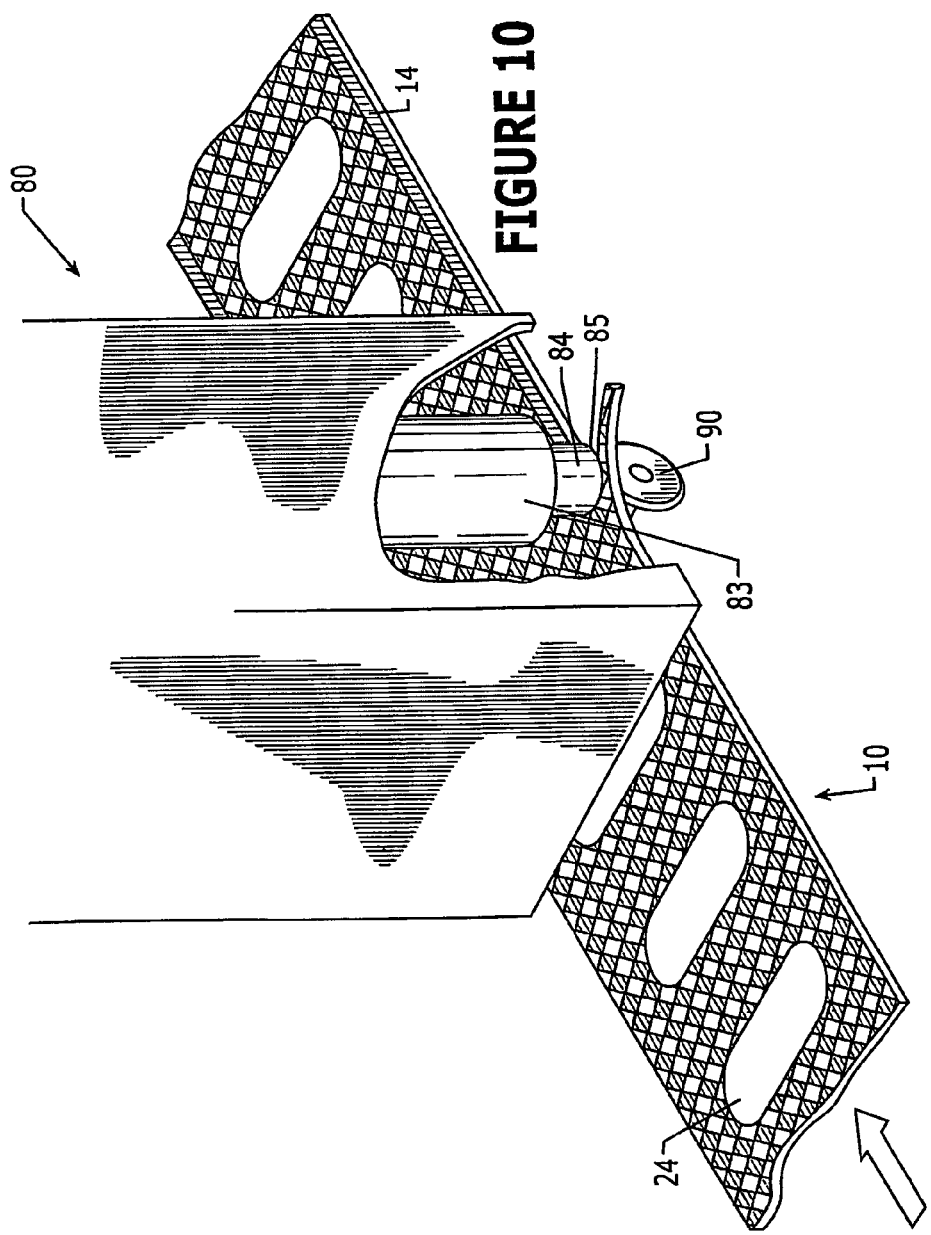

METHOD FOR FORMING A LAMINATE ASSEMBLY WITH AN ULTRASONIC WELDER

CROSS-REFERENCE TO RELATED APPLICATIONS

This application is filed pursuant to 35 USC 371 as a United States National Phase Application of International Patent Application Serial No. PCT/US03/09050 filed on 25 Mar. 2003, which claims priority from U.S. Provisional Application Ser. No. 60/368,107 filed on 26 Mar. 2002 in the United States.

FIELD OF THE PRESENT INVENTION

The present invention relates generally to laminate assemblies for containing pharmaceutical compositions, and related manufacturing methods and systems. More particularly, the invention relates to such laminate assemblies having primary and secondary seals, methods forming such assemblies, and systems incorporating such methods.

BACKGROUND OF THE INVENTION

Laminate assemblies, such as sealed pockets, blisters and packs (in the form of strips, disks or individual containers) for doses of pharmaceuticals in the form of powders, tablets or capsules are well known in the art. As applied in dry powder inhaler ("DPI") technology, the laminate assemblies (e.g., blister strips) generally comprise a base having cavities, pockets or open "blisters" adapted to receive a pharmaceutical composition (e.g., inhalable dry powder). A lid encloses the opening of each cavity or blister, and an adhesive or bonding layer is disposed between the base and lid to effect a seal for the blister.

The blister base and the blister lid may comprise one or more layers or materials. In their most common forms, blisters typically employ lids comprising aluminum, paper, polyester and combinations, blends or laminates thereof. The materials typically employed for the base include aluminum and various polymeric materials including, but not limited to, polyvinyl chloride ("PVC"), oriented polyamide, and blends or laminates of polymers.

The lid is sealed to the base of the blister in a primary sealing operation. Various known methods are often employed to join the lid and base and, hence, seal the blisters. Such methods include adhesive bonding, hot metal bonding, hot metal welding, radio frequency welding and hot bar sealing.

The primary seal of the base and lid may either by complete wherein the lid and base form are substantially continuously fused along their entire interface in the laminate assembly. In other alternative forms, such as where it is desirable to peel the lid off the base to expose the content of the blister, the seal between the lid and base may comprise a cross-hatched grid of bonds surrounding alternating non-bonded areas. In this way, bonded regions form a generally continuous primary seal may is formed which blocks to a high degree ingress or egress of material, moisture, or impurities between the blister and the external environment.

Several problems are, however, associated with the noted primary sealing. First, the use of adhesive bonding requires tight control of the adhesive parameters and/or characteristics (e.g., flow properties) and the spread of the adhesive to ensure even adhesion of the lid to the base.

The noted welding methods have the disadvantage that tightly controlled physical contact is required between the welding head and the substrate (or strip) to be welded. The welding methods are thus often complex and place a limitation on the speed of the welding process.

Generally, blister strips have seal integrity of a high degree, showing no ingress by methods such as liquid immersion studies. In a liquid immersion study, the blister is immersed in a aqueous dye under a vacuum (25-28 inches mercury/850-950 mbar) for 30 seconds. The pressure is released, and the blister remains submerged for 60 additional seconds. The blister is removed, rinsed, dried and the lid or blister cover is removed to expose the blister contents. Macro-leakage is exemplified if dye is present in the blister contents. It has been found that micro leaks may be present in the bonded area that allow ingress or moisture, yet remain undetected by liquid immersion. It is possible that such micro-leaks may allow moisture in the air to enter into the content of the blister from the external atmosphere, modifying its physical or chemical makeup. A suitable method of addressing micro-leakage is therefore desirable.

Several references in the art generally disclose the use of welding to bond plastic materials. They are not however employed for sealing blisters containing pharmaceutical compositions, particularly, dry powder pharmaceutical compositions for inhalation purposes. Illustrative patents include U.S. Pat. Nos. 4,734,142, 4,767,492, 4,866,914, and GB Pub. Nos. 952,581 and 2,248,796. GB Pub. No. 2,248,796, discloses ultrasonic welding is employed to seal "pouch containers". No mention is, however, made of laminate assemblies, blister packs or strips for use in the containment of a medicament or pharmaceutical composition.

Dry powder compositions for respirable drugs pose certain challenges to packaging. Dry powders must be manufactured to very tightly controlled within a narrow aerodynamic size range. Only particles having a specific narrow range of aerodynamic size will deposit in the desired location in the pulmonary system. For instance, a particle for local treatment of respiratory conditions, such as asthma, must have a particle size of less than 10 microns, more preferably from 2 to 5 microns. Alternatively for alveolar deposition, particles must be between 1-3 microns in aerodynamic size. A change in the environment in which the composition of particles are contained in packaging may, in some cases, lead to a modification in the aerodynamic behavior of particles. For example, moisture in some materials may play increase particle to particle agglomeration, which causes particles to form larger aggregates, shifting the particle size of aerosolized powder particles outside of this desired range. Larger particles, the result of either moisture swelling or increased agglomeration of smaller particles, will cause the particle(s) to deposit away from the target region of the lung, for example in the device itself, or in the mouth or the throat of the patient. As such agglomeration has been associated with moisture ingress into blister and other packaging, the reduction of the causes of moisture effects has been a desired outcome of the investigations of pharmaceutical manufacturers.

It should be noted that particle sizes, either in aerodynamic or geometric measures, referred to herein relate to a particles effective particle size. Effective particle size denotes the apparent particle size of a body without distinction as to the number of individual particles which go to make up that body, i.e., no distinction is made between the single particle of given size and an agglomerate of the same size which is composed of finer individual particles.

In this endeavor to reduce the impact of moisture or environmental conditions in blisters, the primary seal integrity of laminate structures has been investigated. Suprisingly, it has been found that seals formed as a result of primary sealing are not always formed such that all avenues of ingress into the interior of the blister are eliminated. When such pathways between the blister interior and external environment remain after primary sealing, moisture can enter the blister and cause chemical or physical change, thus negatively impacting the characteristics of the blister contents. Such "leaks" in the primary seal may result from the lid and base mating surfaces not being brought into intimate contact with each other to undergo sufficient bonding. The applicant's investigations have determined is may occur, in some instances, when excess powder is deposited on the base material about the periphery of the blister, rather than solely in the blister. When the lid is placed over the base, this deposited excess powder separates the bonding layers of the two. When sealing conditions (such as heat, energy and/or pressure) is applied, a cavity remains between the base and the lid surrounding this excess material. Other sources of leaks may also exist, such as a failure of machinery dies to closely associate base and lid layers.

In some instances, the seal may not form and a leak will exist after primary sealing. In other instances though, the area around the periphery of the blister is not itself sealed, but is a adjacent to a sealed area. If the sealed area is cut away during subsequent processing, or the sealed portion is otherwise breached, the non-sealed pocket becomes a pathway for moisture ingress. An example of subsequent processing may occur, for example, by trimming the edges of a formed blister in order to make the strip with an appropriate width to be placed in a given device. Such devices include the dry powder inhaler Diskus® device marketed by GlaxoSmithKline, which is depicted in U.S. Pat. No. 5,873,360, (which is incorporated herein by reference).

Subsequent processing, such as trimming, may also disrupt the fused bond between base and lid, causing additional leakage. Hence, processing in some instances may increase the number or the severity of leaks on the blister strip. These causes of leakage are relatively rare, however, in pursing the best products available for delivering medication, reduction of such leaks is desirable.

It is therefore an object of the present invention to provide a method and system for forming a laminate assembly that fuses leaks in a primary seal by including a secondary seal positioned over a portion of the primary seal of the laminate assembly. The secondary seal may be formed by any suitable mechanism, for example a heated pneumatic press (a.k.a. a hot bar/ridge press) or an ultrasonic welding device. The secondary seal heals leaking blister sections, while not adversely impacting the integrity of non-leaking regions of the primary seal.

It is another object of the invention to provide a method and system for forming a laminate assembly that substantially simultaneously fuses and shears the laminate assembly between the blister pocket and the edges of the laminate material.

It is another object of the invention to provide a method and system for forming a laminate assembly that includes the step of providing a secondary seal via hot bar heat sealing, or ultrasonic means.

It is another object of the invention to provide a method and system for forming a laminate assembly having primary and secondary seal regions.

It is another object of the invention to provide a method and system for forming a laminate assembly containing a pharmaceutical composition that employs heat seal to form a primary seal, mechanical shearing of a portion of the sealed material, followed by a secondary sealing step, for example by hot bar sealing or ultrasonic sealing, to form a laminate assembly having a reduced degree of moisture ingress as compared to solely primarily sealed laminate assemblies.

It is another object of the invention to provide a method and system for forming a laminate assembly that includes prefilling each blister in the base layer with a pharmaceutical composition, sealing the laminate assembly, shearing the laminate assembly to a specific size and/or shape, and then providing a secondary seal to the laminate assembly to cure leaks in the laminate existing after shearing. Secondary sealing may occur before, simultaneously with or after shearing.

It is a yet further objective of the present invention to provide a laminate assembly with a primary seal and a substantially continuous secondary seal along the edge(s) of the laminate assembly.

It is yet another object of the invention to provide packaging for a dry powder pharmaceutical composition having primary and secondary seals that enhance the stability of the pharmaceutical composition.

It is a still further or alternative object of the present invention to a provide a secondary seal which bonds regions of a base and lid material to form a coupled layer enveloping a fused polymeric layer therebetween.

SUMMARY OF THE INVENTION

The present invention relates to a laminate assembly, comprising a base sheet having at least one blister formed therein; a pharmaceutical composition displaced in said blister; and a lid sheet bonded to said base sheet to form a primary seal therebetween, thus forming a primarily sealed laminate assembly; said primary sealed laminate assembly having a secondary seal formed therein.

The laminate assembly may contain a primary seal comprising bonded regions and non-bonded regions. In some embodiments, the non-bonded regions are separated from each other by bonded regions in a regular pattern. In certain embodiments, the regular pattern is grid-like or cross-hatched in appearance.

The laminate assembly comprises a base sheet comprising a first mating surface. The lid sheet comprises a second mating surface. The primary and secondary seals are formed as bonds between said first and second mating surfaces.

In some embodiments, the secondary seal is positioned within the area of the primary seal. In some embodiments, said primary seal is substantially continuous.

In further embodiments, the blister is surrounded by a periphery and the laminate assembly defines an edge, and an edge region between the edge and the closest point on the periphery of the blister, and the secondary seal is located at least in part in the edge region. In some embodiments, the secondary seal has a width of between 0.05 and 2 mm.

In further embodiments of the present invention, the first mating surface the base sheet comprises at least one polymeric material, such as, in some embodiments, polyvinyl chloride (PVC). Alternatively, in other embodiments, the first mating surface comprises heat seal lacquer. In still further embodiments, the second mating surface comprises at least one polymeric material, such as PVC.

In some embodiments, the laminate assembly is substantially elongated. In other embodiments, the laminate assembly is substantially circular.

The secondary seal of the assembly may be positioned in any suitable position on the laminate assembly. In one embodiment, the secondary seal is positioned within 1 mm of the edge. In still further embodiments, the secondary seal is positioned at said edge of the laminate assembly.

In certain embodiments, the combined thickness of the first mating surface and second mating surface in the secondary seal is less than the combined thickness of the first and second mating surfaces in the primary seal.

In certain further embodiments, the secondary seal tapers in the area of said edge.

In still further embodiments, the base sheet comprises a first metallic layer, and the lid sheet comprises a second metallic layer, and the first and second metallic layers are coupled to envelope the first and second mating surfaces in the secondary seal. Coupling can be by any suitable fashion, including but not limited to crimping of the metallic layers, or fusion or other bonding of the metallic layers.

The laminate assembly may contain one or more (a plurality) of blisters.

In certain embodiments, the laminate assembly of the present invention has a secondary seal formed by a heated pneumatic press. In certain forms, the heated pneumatic press is a hot bar press. The bar may be any suitable shape, including rotary or planar. Alternatively, the secondary seal may be formed by ultrasonic welding.

In one preferred embodiment, the secondary seal is substantially impermeable to humidity.

In certain embodiments of the invention, the material in the blister is a pharmaceutical composition. In some alternate forms, the pharmaceutical composition includes at least one excipient and at least one medicament. The excipient, in certain embodiments, comprises one or more carbohydrates, amino acids, stearates, or sterols, or combinations thereof. One suitable excipient comprises lactose. In certain embodiments, the medicament comprises a corticosteroid, beta-agonist, A2a modulator (agonists or antagonists), anticholinergic or combination thereof. One preferred medicament comprises a combination of one or more fluticasone esters and salmeterol or a salt thereof. The fluticasone ester is, in one form, a propionate ester, and in another form a furoate ester.

The present invention also relates to a method of forming a laminate assembly. The method, in one embodiment, comprises the steps of:

a. providing a base sheet and a lid sheet, said base sheet having formed therein a blister pocket containing a pharmaceutical composition and comprising a first mating surface; said lid sheet comprising a second mating surface, said base and lid sheets having a primary seal formed between said first and second mating surfaces to form a primarily sealed laminate assembly b. exposing a portion of said primary sealed laminate assembly to a bonding device to create a secondary seal therein.

In one embodiment, the primary seal is formed by heat sealing.

In further embodiments, the blister has a periphery, and the laminate assembly has an edge. An edge region is defined between the edge and the closest point on said periphery to said edge, and said bonding device creates said secondary seal in said edge region. In certain alternative embodiments, the bonding device is a heated pneumatic press.

In certain embodiments, the heated pneumatic press comprises a hot bar plate comprising at least one ridge having a width greater than 0.05 mm. In certain embodiments, the at least one ridge has a width between approximately 0.5 and 1.5 mm. The ridge can have any configuration, including flat, concave, convex, or tapered/angled. The slope of the angle ridge may be positive, negative or both (such as with a double-edged ridge). In certain embodiments, the plate possesses two ridges spaced from each other. In the two ridge embodiment, the each of said ridges each have a width between 0.05 and 2 mm, the two widths being the same or different as desired. The plate may also take the form of one or more heated rotary heads, each having an annular edge and the ridges may be formed on the annular edge(s) of the heated rotary head(s). The anvil may also be rotary in form, such that the laminate assembly passes between the heated rotary head and the anvil/rotary anvil to form the secondary seal.

In further embodiments, the bonding device is an ultrasonic welder. In some embodiments, the ultrasonic welder comprises a welding sonotrode and an anvil, and the primary sealed laminate assembly is positioned therebetween to form the secondarily sealed laminate structure. In one alternative embodiment form, the anvil comprises at least one rotary anvil defining an annular edge.

In certain embodiments, the anvil comprises an axle having an axis of rotation and a pair of rotary anvils: a first rotary anvil having a first side extending generally tangentially from said axis of rotation and having a first annular edge; and a second rotary anvil having a second side extending generally tangentially from said axis of rotation and having a second annular edge. The first and second a rotary anvils are spaced from each other. At least a portion of the first and second annular faces form annular edges, at least a part of which contact the laminate structure during the creation of said secondary seal. The annular edge may be substantially flat, angled or curved (concave or convex) in cross-view.

The method of the instant invention may further comprise the step of removing a portion of said sealed laminate assembly before, during or after secondary sealing. In one embodiment, the step of removing a portion of said primarily sealed laminate assembly occurs substantially simultaneously with the creation of said secondary seal. In some embodiments, the step of removing a portion of said primarily sealed laminate assembly occurs as a result of mechanical cutting. In an alternative form, the step of removing a portion of said primarily sealed laminate assembly is achieved with an ultrasonic welder.

In further embodiments, the base sheet comprises a base metal layer, and the lid sheet comprises a lid metal layer, said base and lid metal layers are at least partially coupled during creation of said secondary seal.

In certain embodiments, the base sheet comprises a base metal layer, and the lid sheet comprises a lid metal layer, and the base and lid metal layers are farther apart in the region of the primary seal, and closer to each other in the region of the secondary seal.

In other embodiments, the laminate assembly has a thickness, and the thickness of the laminate assembly is greater in the region of the primary seal than in the region of the secondary seal.

In still further embodiments, the base sheet includes at least a first bonding material disposed on said first mating surface and the lid sheet includes at least a second bonding material disposed on said second mating surface. In certain embodiments, the first bonding material and/or second bonding material independently comprises at least one polymeric material, for example, polyvinyl chloride; a heat seal lacquer, or a metallic layer, e.g., aluminum.

The laminate assembly in the method may be any shape, including but not limited to substantially elongate, or substantially circular. In another embodiment of the method of the present invention, the laminate assembly comprises a plurality of blisters positioned along the length of the elongated laminate assembly. Each blister has a periphery and the laminate assembly defines an edge. A first edge region is defined between the edge and the closest point along the periphery thereto, and the secondary seal extends substantially continuously within said first edge region along a length of said elongated laminate assembly.

In certain embodiments, the primary seal comprises a cross-hatched or checkered pattern of bonded regions separating non-bonded regions, and the secondary seal is substantially continuous and overlies a portion of the primary seal (thus sealing the non-sealed regions of the primary sealed area).

In a further embodiment, the base sheet has a first structural material having a first material edge, and the lid sheet has a second structural material having a second material edge, and formation of said secondary seal during the method of the present invention results in the coupling (e.g., crimping, fusion etc . . . ) of a portion of the first and second structural materials at the first and second material edges.

In a further embodiment of the present invention, the invention relates to a method for preserving the stability of a pharmaceutical composition contained in a laminate assembly, comprising the steps of:
 providing a base sheet and lid sheet, said base sheet including at least one blister adapted to receive said pharmaceutical composition, said blister having a periphery region;
 filling said blister with said pharmaceutical composition;
 bonding said base and lid sheets to create a primary seal therebetween, said bonded base and lid sheets having at least a first edge region; and
 fusing said bonded base and lid sheets to form a first substantially continuous secondary seal within said edge region.

The present invention also relates to a system for forming a laminate assembly comprising: a secondary sealing apparatus comprising a source of bonding energy, said bonding energy being directed onto a primarily sealed laminate assembly and causing formation of a secondary sealed laminate assembly.

In certain embodiments, the system further comprises:
 a. a primary sealed laminate assembly transport mechanism for transporting a filled and primarily sealed laminate assembly to said source of bonding energy.

In further embodiments the system further comprises a primary seal bonding mechanism for forming a primary seal in a laminate assembly. The laminate assembly comprises a base sheet defining blister and a first mating surface, and a lid sheet defining a second mating surface, said primary seal being formed between said first and second mating surfaces.

In still further embodiments, the system further comprises a filling station for filling said blister with a pharmaceutical product to form a filled base sheet prior to primary sealing.

In further embodiments, the system further comprises a base transporter for transporting a base sheet to the base filling station.

In still further embodiments, the system further comprises a lid transporter for transporting a lid sheet proximate to said filled base sheet.

In still further embodiments, the system further comprises a laminate assembly trimmer for removing a portion of the laminate assembly.

In still further embodiments, the source of energy both creates said secondary seal and acts as said laminate assembly trimmer that removes a portion of said first edge region.

In certain alternative embodiments, the secondary sealing apparatus comprises primary a heated pneumatic press. The heated pneumatic press preferably comprises a thermal head or plate, in certain embodiments. The plate may be flat (planar) or rotary. In some embodiments, the hot bar plate comprises at least one ridge extending therefrom. The ridge may have a width greater than 0.05 mm, in certain embodiments, the at least one ridge has a width between approximately 0.5 and 1.5 mm. The ridge may be of any configuration, including but not limited to flat, concave, convex, or tapered/angled. The slope of the angle ridge may be positive, negative or both (such as with a double edged ridge).

In certain embodiments, the plate possesses two ridges spaced from each other. The ridges may each independently have a width between 0.5 and 2 mm.

In other embodiments, the bonding device is an ultrasonic welder. In certain embodiments, the ultrasonic welder comprises a welding sonotrode and an anvil, and the primary sealed laminate assembly is positioned therebetween to form said laminate structure. In certain embodiments, the anvil comprises at least one rotary anvil defining at least one annular edge. In certain embodiments, the anvil comprises an axle having an axis of rotation and a pair of rotary anvils; a first rotary anvil having a first side extending generally tangentially from said axis of rotation and having a first annular edge; and a second rotary anvil having a second side extending generally tangentially from said axis of rotation and having a second annular edge; said first and second a rotary anvils being spaced from each other, at least a portion of said first and second annular edges contacting said laminate structure during the creation of said secondary seal. The annular edge(s) may be substantially flat, angled, curved in cross-view.

In further embodiments of the system the trimmer removes a portion of said primarily sealed laminate assembly before, during or after secondary sealing. In certain of these embodiments, the step of removing a portion of said primarily sealed laminate assembly occurs substantially simultaneously with the creation of said secondary seal.

The trimmer used in the system may be any suitable device, including a mechanical shear and an ultrasonic welder.

In certain embodiments, the base sheet comprises a base metal layer, and said lid sheet comprises a lid metal layer, said base and lid metal layers are at least partially coupled during creation of said secondary seal in the system of the present invention.

In certain embodiments, the base sheet comprises a base metal layer and said lid sheet comprises a lid metal layer, and said base and lid metal layers are farther apart in the region of said primary seal, and close to each other in the region of said secondary seal having been compressed by said secondary sealing apparatus.

In further embodiments, the laminate assembly has a thickness and the thickness of said laminate assembly is greater in the region of the primary seal than in the region of the secondary seal, having been compressed by said secondary sealing apparatus in the region of the secondary seal.

As mentioned above, the laminate assembly can be of any configuration, including, for example, substantially elongate, or substantially circular.

Further, the laminate assembly may comprise a plurality of blisters positioned along the length of the elongated laminate assembly. In such a configuration, the blister has a periphery and the laminate assembly defines an edge. A first edge region is defined between the edge and the closest point along the periphery thereto. The secondary seal extends substantially continuously within this first edge region along a length of the elongated laminate assembly.

In one type of embodiment, the system employs a mechanism for forming said primary seal as a cross-checked pattern of bonded regions separating non-bonded regions, and the secondary seal as substantially continuous and overlying a portion of the primary seal.

In some embodiments, the system of employs a base sheet having a first structural material having a first material edge, and a lid sheet having a second structural material having a second material edge, and formation of the secondary seal results in the coupling of a portion of the first and second structural materials at the first and second material edges.

In certain embodiments of the present invention, the system fills and the blister therefore contains a medicament in respirable dry powder form. In certain embodiments, the medicament comprises therapeutically active material having an aerodynamic diameter of between 1 and 5 microns. In certain embodiments, the therapeutically active materials comprise a beta-agonist, corticosteroid, anti-cholinergic, or hormone.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 2 is a top plan view of a section of an elongate laminate assembly in the prior art;

FIG. 3 is a top plan view of an elongate laminate assembly having a secondary seal;

FIG. 10 is an elevational view of an ultrasonic sealing and shearing unit;

DETAILED DESCRIPTION OF THE PREFERRED EMBODIMENT

Figure 1:
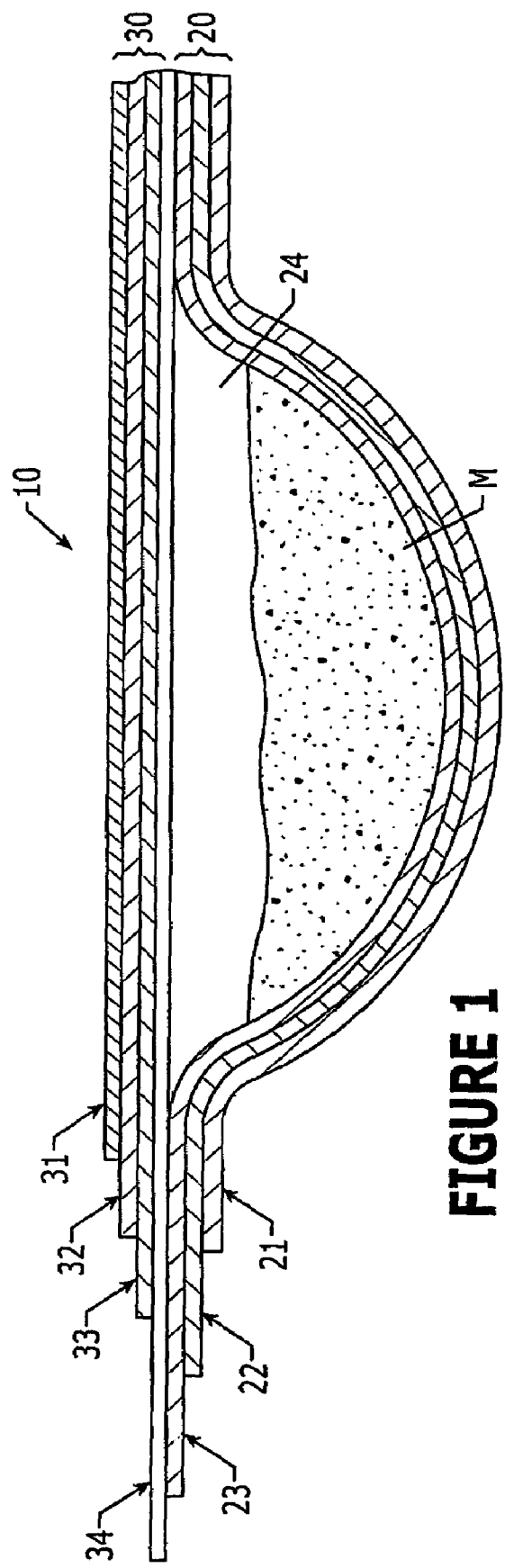
FIG. 1 is a partial cross sectional view of a prior art laminate structure having a multi-layered laminated base, having a blister formed therein, and a multi-layered laminate lid.

Before describing the present invention in detail, it is to be understood that this invention is not limited to particularly exemplified method or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to "a blister" includes two or more such blisters.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In describing the present invention, the following terms will be employed, and are intended to be defined as indicated below.

Definitions

By the term "medicament", as used herein, is meant to mean and include any substance (i.e., compound or composition of matter) which, when administered to an organism (human or animal) induces a desired pharmacologic and/or physiologic effect by local and/or systemic action. The term therefore encompasses substances traditionally regarded as actives, drugs and bioactive agents, as well as biopharmaceuticals (e.g., peptides, hormones, nucleic acids, gene constructs, etc.) typically employed to treat diseases and inflammatory and respiratory disorders (e.g., asthma), including, but not limited to, analgesics, e.g., codeine, dihydromorphine, ergotamine, fentanyl or morphine; anginal preparations, e.g., diltiazem; antiallergics, e.g., cromoglycate (e.g., as the sodium salt), ketotifen or nedocromil (e.g., as the sodium salt); antiinfectives e.g., cephalosporins, penicillins, streptomycin, sulphonamides, tetracyclines and pentamidine; antihistamines, e.g., methapyrilene; anti-inflammatories, e.g., beclomethasone (e.g., as the dipropionate ester), fluticasone (e.g., as the propionate ester), flunisolide, budesonide, rofleponide, mometasone (e.g., as the furoate ester), ciclesonide, triamcinolone (e.g., as the acetonide); 6α,9α-difluoro-11β-hydroxy-16α-methyl-3-oxo-17α-propionyloxy-androsta-1,4-diene-17β-carbothioic acid S-(2-oxo-tetrahydro-furan-3-yl) ester or 6α,9α-difluoro-17α-[(2-furanylcarbonyl)oxy]-11β-hydroxy-16α-methyl-3-oxoandrosta-1,4-diene-17β-carbothioic acid S-fluoromethyl ester; antitussives, e.g., noscapine; bronchodilators, e.g., albuterol (e.g., as free base or sulphate), salmeterol (e.g., as xinafoate), ephedrine, adrenaline, fenoterol (e.g., as hydrobromide), formoterol (e.g., as fumarate), isoprenaline, metaproterenol, phenylephrine, phenylpropanolamine, pirbuterol (e.g., as acetate), reproterol (e.g., as hydrochloride), rimiterol, terbutaline (e.g., as sulphate), isoetharine, tulobuterol or 4-hydroxy-7-[2-[[2-[[3-(2-henylethoxy)propyl]sulfonyl] ethyl]amino]ethyl-2(3H)-benzothiazolone; PDE4 inhibitors e.g. cilomilast or roflumilast; leukotriene antagonists e.g. montelukast, pranlukast and zafirlukast; adenosine 2a agonists, e.g., (2R,3R,4S,5R)-2-[6-Amino-2-(1S-hydroxymethyl-2-phenyl-ethylamino)-purin-9-yl]-5-(2-ethyl-2H-tetrazol-5-yl)-tetrahydro-furan-3,4-diol (e.g., as maleate); α$_4$ integrin inhibitors, e.g., (2S)-3-[4-({[4-(aminocarbonyl)-1-piperidinyl]carbonyl}oxy)phenyl]-2-[((2S)-4-methyl-2-{[2-(2-methylphenoxy)acetyl]amino}pentanoyl)amino]propanoic acid (e.g., as free acid or potassium salt)], diuretics, e.g., amiloride; anticholinergics, e.g., ipratropium (e.g., as bromide), tiotropium, atropine or oxitropium; ganglionic stimulants, e.g., nicotine; hormones, e.g., cortisone, hydrocortisone or prednisolone; xanthines, e.g., aminophylline, choline theophyllinate, lysine theophyllinate or theophylline; therapeutic proteins and peptides, e.g., insulin or glucagon; vaccines, diagnostics, and gene therapies. The noted medicaments may be employed in the form of salts, (e.g., as alkali metal or amine salts or as acid addition salts) or as esters (e.g., lower alkyl esters) or as solvates (e.g., hydrates) to optimize the activity and/or stability of the medicament.

The term "medicament" specifically includes albuterol, its salts and/or solvates, e.g., salbutamol sulphate, salmeterol, its salts and/or solvates, e.g., salmeterol xinafoate, fluticasone, its esters, including fluticasone propionate and fluticasone furoate (e.g., the 17-alpha-2 furoate), and beclomethasone dipropionate, and salts or solvates thereof.

The term "medicament" further includes formulations containing combinations of active ingredients, including, but not limited to, salbutamol (e.g., as the free base or the sulfate salt); salmeterol (e.g., as the free base or the xinafoate salt); or formoterol (e.g., as the fumarate salt); in combination with an anti-inflammatory steroid such as a beclomethasone ester (e.g., the dipropionate), a fluticasone ester (e.g., the propionate or 17-furoate) or budesonide; or ipratroprium (e.g. as the bromide salt).

By the terms "medicament formulation" and "pharmaceutical composition", as used herein, it is meant to mean a combination of at least one medicament and one or more added components or elements, such as an "excipient" or "carrier." As will be appreciated by one having ordinary skill in the art, the terms "excipient" and "carrier" generally refer to substantially inert materials that are nontoxic and do not interact with other components of the composition in a deleterious manner. Examples of normally employed "excipients," include pharmaceutical grades of carbohydrates, including monosaccharides, disaccharides, cyclodextrins and polysaccharides (e.g., dextrose, sucrose, lactose, raffinose, mannitol, sorbitol, inositol, dextrins and maltodextrins); starch; cellulose; salts (e.g., sodium or calcium phosphates, calcium sulfate, magnesium sulfate); citric acid; tartaric acid; glycine; leucine; high molecular weight polyethylene glyols (PEG); pluronics; surfactants; lubricants; stearates and their salts or esters (e.g., calcium stearate or magnesium stearate); amino acids (e.g., leucine or valine); fatty acids; and combinations thereof.

The noted medicaments and excipients may be prepared as composite materials, such as by co-precipitation, co-crystallization, or by coating one material on another, or other compositing methods, or may be prepared as blends of particulate materials, where the excipient acts as a carrier, lubricant, flow-agent, stabilizer and/or sustained release agent.

By the term "pharmaceutical delivery device", as used herein, it is meant to mean a device that is adapted to administer a controlled amount of a composition to a patient, including, but not limited to, dry powder inhalers, including the Diskus® device disclosed in U.S. Pat. Nos. Des. 342,994, 5,590,654, 5,860,419, 5,837,630 and 6,032,666; the Diskhaler® device disclosed in U.S. Pat. Nos. Des 299,066; 4,627,432 and 4,811,731; the Rotahaler® device disclosed in U.S. Pat. No. 4,778,054, or any other metered dose dry powder inhaler incorporporating a pre-metered dose of dry powder.

By the terms "laminate assembly" and "laminate structure", as used herein, it is meant to mean conventional pharmaceutical packaging having at least one sealable pocket, cavity or blister adapted to contain at least one material, (e.g., medicament or a pharmaceutical composition in any conventional form, including a powder, capsule or tablet). The terms "laminate assembly" and "laminate structure" thus include conventional blister strips (as used e.g., in GlaxoSmithKline's Diskus® inhaler), disks (e.g., Rotadisk™), packs and individual containers that are employed in the aforementioned "pharmaceutical delivery devices."

As will be appreciated by one having ordinary skill in the art, the present invention substantially reduces or eliminates the disadvantages and drawbacks associated with conventional methods and systems for forming laminate assemblies.

FIG. 1 depicts one suitable laminate assembly (10) for use in the various aspects of the current invention. FIG. 1 depicts a laminate assembly (10) comprising a base sheet (20) and a lid sheet (30). The base and/or lid sheets may comprise a single material, such as aluminum. The base and lid sheets may be bonded together using an adhesive, such as a heat seal lacquer, positioned between the base and lid materials. More preferably though, the base and lid are each laminate structures. For example, the base and lid may be comprised of a laminate of a structural material and at least one bonding material on at least one mating surface. The bonding material(s) preferably comprises at least one polymeric material (e.g., polyvinyl chloride) or at least one heat seat lacquer (e.g., vinylic heat seat lacquer).

In one suitable embodiment shown in FIG. 1, the base sheet (20) comprises an outer layer (21) that may suitably be formed from a material such as oriented polyamide (nylon). The outer layer is adhesively bonded to a middle layer (22) that may comprise a suitable material, such as a metallic material, for example, aluminum foil. The middle layer is then adhesively bonded to an inner or adhesive layer (23) that makes up a first bonding or mating surface. Suitable materials for this first bonding surface include polyvinyl chloride PVC). The bonding surface can be any material adapted to bond with the mating surface of the lid material.

The base sheet has formed therein a blister or pocket (24), which contains a material, such as a medicament (M). Suitable medicaments include, but are not limited to those in respirable powder form. Respirable powder medicaments contained in such a blister are considered to be within the scope of one embodiment of the present invention.

Pocket (24) is, when assembled as a blister pack, covered by the lid sheet (30). The lid sheet comprises a top layer (31), composed of any suitable material, for example in one embodiment, paper. The top layer is adhesively bonded to second lid layer (32), which may comprise any suitable material, e.g., polyester. The second lid layer is in turn adhered to a third lid layer (33), which comprises any suitable material, such as a metallic material, for example, aluminum foil. The third lid layer is also referred to herein as the metallic layer of the lid. The third lid layer has bonded thereto a second mating surface (34), comprising, for example, a heat seal lacquer.

As will be appreciated by one having ordinary skill in the art, various conventional adhesives can be employed to bond or adhere the laminate layers in the base and lid sheets. Such adhesives include, but are not limited to, acrylics, cyanoacrylates and polyurethanes.

The base sheet and lid sheet are fused or bonded during processing to form a sealed blister pack, as depicted in FIG. 1 by bonding of the first and second mating surfaces, for example be heat sealing.

Blister packs incorporated in current commercial products, such as the GlaxoSmithKline Diskus® device, have only a primary seal. An example of a primary sealed blister is depicted in FIG. 2. FIG. 2 shows a three-blister section of an elongate laminate assembly containing a plurality of blisters. The laminate assembly has side edges (11a and 11b) extending along its length. Any number of blisters may be included on such a strip, depending on the intended use of the laminate assembly. The blister is formed such that its rim or periphery is surrounded by the first bonding surface. In FIGS. 2 and 3, the region of the first bonding surface between the first side edge (11a) and the closest portion of the blister periphery is designated as a first edge region (ER1). The region of the first bonding surface between the second side edge 11b and the closest portion of the blister periphery thereto is designated as a second edge region (ER2).

Across virtually all of the first and second bonding surfaces is depicted a primary seal. The primary seal depicted comprises a grid like pattern of fused regions (12) and, in the depicted embodiment, the fused regions surround regularly spaced non-fused regions (13). This primary sealed region is formed when the base and lid are situated such that the second mating surface of the lid is over and facing the first mating surface of the base sheet and heat and pressure are applied, for example by a heated plate press. The plate has formed thereon the grid like pattern shown in FIG. 2. The heat of the plate causes the one or more of the first and second bonding surfaces to melt, causing the base and lid to be fused together. The grid-like or cross-hatched construction of the seal pattern allows a relatively sealed environment to be formed that more or less precludes ingress into and egress from the interior of the blister(s) of the sealed laminated assembly. At the same time, the existence of non-fused regions allows the lid to be more easily pealed from the base to expose the content of the blister.

Each blister 24 has a length $l_1$ that is sized to receive a given product. For respirable medicaments, the blister length $l_1$ is preferably from 1.5 to 15.0 mm, more preferably, from 1.5 to 8.0 mm, and most preferably about 7.5 mm, measured along its longer axis. The blisters have a width 12 that is preferably from 1.5 to 10.0 mm, more preferably, from 1.5 to 8.0 mm, and most preferably about 4.0 mm, measured along its shorter axis. The blisters 24 are typically at 7.5 mm centers along the blister strip 10. Each blister preferably contains an effective dosage of medicament. With inhaled medicinal powders, the dose will typically be less than 30 mg of powder, more preferably, between 5-25 mg of powder, and most preferably, approximately 12.5 mg of powder. The blister meets the mating surface of the base layer around a periphery. The thickness of the base (20) is in the range of approximately 0.17-0.19 mm, and the combined thickness of the base and lid sheets when fused is approximately 0.27 mm.

The seal integrity of the grid pattern primary sealed blister shown is quite high. Overall, the desired properties of the materials of the blister contents M is satisfactory and the blister contents are chemically and physically stable. When tested in with a testing method wherein the primarily sealed blisters are immersed in a liquid dye under vacuum can identify major leaks, and such testing indicates the suitability of the blisters.

The aerodynamic properties of a dry powder may be measured in a cascade impactor (such as and multi-stage Andersen cascade impactor). Moisture ingress or egress may cause, for example particle aggregation, where suitably sized particles, for example in the aerodynamically 1-5 micrometer size range, form aggregates or particles that are themselves outside of the "respirable size range." When particles are exposed to moisture, the 1-5 micron particles tend to adhere to each other forming particles greater than 5 microns. Particle aggregates that are not subsequently broken up upon aerosolization won't deposit in their target region of the lung, will instead be deposited in the mouth or throat where they are passed to the stomach.

One factor leading to particle aggregation is a change in humidity inside a blister. The applicants have identified that in a small number of instances, the edge regions (ER1 and ER2) contain micro-pathways or channels between the outside environment and the content of the sealed blister, even after primary fusing. These micro-leak pathways allow moisture ingress from the air, but are undetectable by standard liquid dye immersion testing. Applicants have found that moisture ingress through micro-leaks may lead to particle aggregation or blister content degradation. As any factor negatively impacting product performance should be minimized, the impact of this behavior is best eliminated to eliminate potential chemical or physical stability issues.

Primary seal leakage generally occurs between the blister periphery and the edges of the laminate assembly, (11*a* and 11*b*) through or between the mating surface materials. Applicant's investigations have shown that in some instances, excess powder may be deposited on the base material about the periphery of the blister prior to sealing, rather than solely in the blister. When the lid sheet is placed over the base sheet, this deposited excess powder it trapped between the bonding layers of the base and lid sheets separating the bonding layers. When sealing conditions (such as heat, energy and/or pressure) is applied, a cavity remains between the base and the lid surrounding this excess material. Other sources of leaks may also exist, such as a failure of machinery dies to closely associate base and lid layers.

The present invention cures leakage in the mating surface interface by through creation of a secondary seal between the blister and the edges of the blister pack/laminate assembly. In the elongate blister strip type of dry powder delivery system, the secondary seal is preferably formed in the edge regions, ER1 and ER2.

FIG. 3 shows a blister pack of the present invention containing primary and secondary seals. The blisters (24) are surrounded by a mating surface forming a primary seal having bonded/fused regions (12) and non-bonded/non-fused regions (13). The secondary seal (14) is placed within the edge regions (ER1 and ER2). The secondary seal is desirably substantially continuous and runs the length of the blister strip. The seal is formed between the mating surfaces of the base and lid sheets. When not continuous, the secondary seal should be positioned to reduce leakage, such as between the blister and the edge of the laminate assembly along blister length ($l_1$) as will be appreciated by those in the art.

The secondary seal advantageously provides a further barrier to moisture entry. Secondary sealing in the region of the trimming, or adjacent thereto (e.g. between the edge 11*a* and the periphery of the blister) lessens the likelihood that leaks exist in this secondarily sealed region, and thus reduce leakage due to trimming. Secondary sealing may close gaps in the non-fused regions of the primary seal, thus reducing the number possible avenues of entry into the content of the blister.

Secondary sealing may also operate to reduce moisture ingress/egress in another fashion. If moisture flow is viewed as being due to the moisture permeability through the fused bonding layers, then it is probable that a reduction in the thickness of the bonding layer will likely result in decreased moisture flow. FIG. 4A-4C depict aspects of this phenomenon. FIG. 4A is partial a cross-sectional view, taken along a line extending across the strip between the edges (11*a* and 11b). As can be seen, the fused region of the primary bond (12) has a greater thickness between the other layers of the base and lid sheets in the primary sealed region (shown as measure "$D_0$"), while the fused region of the secondary seal (14) has a lesser thickness within the secondary seal region (shown as measure "$D_t$"). Because the thickness of PVC bonded portion ($D_t$) is less in the secondary sealed region, there is a thinner or narrower conduit (in this case as measured between the first and second metallic layers) through which moisture can enter. Analogizing the blister seal to a pipe, more fluid media can pass through a wider diameter pipe than a smaller diameter pipe. It is believed that secondary sealing reduces the "pipe diameter" by crimping the blister laminate, reducing the thickness of the PVC layer, thus impeding moisture flow through the PVC/bonded layer.

The edge regions (ERs) of the laminate assembly are in some instances trimmed to remove excess material from the edge region, reducing the width of the strip and allowing it to be placed inside a compact inhalation device. For example, the laminate assembly after undergoing primary sealing can be approximately 28 mm wide, to permit or facilitate use in filling and primary sealing machinery. Before placing the blister strip in a device, however, the laminate assembly may undergo subsequent trimming to yield a blister strip having, for example, a width of 12.5 mm. This trimming process may increase the degree of leakage in a blister by creating openings into cavity of non-bonded regions that formed despite primary sealing, or may create a new avenue of moisture ingress by stressing and breaching a bonded portion the fused mating surfaces of the laminate assembly. Secondary sealing may occur before trimming, simultaneously with trimming, or after trimming.

Secondary sealing may be employed with both trimmed and non-trimmed embodiments in a further fashion. In this alternative embodiment, the distance between the metallic layers in the base and lid regions is tapered closer to each other thus tapering the thickness of the PVC/bonding layer, as depicted in FIG. 4B. This substantially reduces the area over which water vapor may enter the possibly permeable bonding material. Because the PVC undergoes a thickness reduction, the PVC necessarily extrudes out at the edges (11a and 11b). In the ideal case, extrusion tapers to a point.

Lastly, secondary sealing may also potentially be conducted in a way that couples (crimps, fuses or otherwise brings into intimate contact) the first and second metallic layers at the edges. So coupled, the metallic layers pinching off and envelope the PVC bonded region in a casing of thin metal, as shown in FIG. 4C. In this instance, the edges (11a and 11b) are coupled together, thereby providing a more impermeable barrier to moisture flow in the PVC/bonding region. A coupled/crimped first and second metallic layer edge seal and/or a fused first and second metallic edge seal are both considered specifically within the scope of the current invention.

Figure 4A:
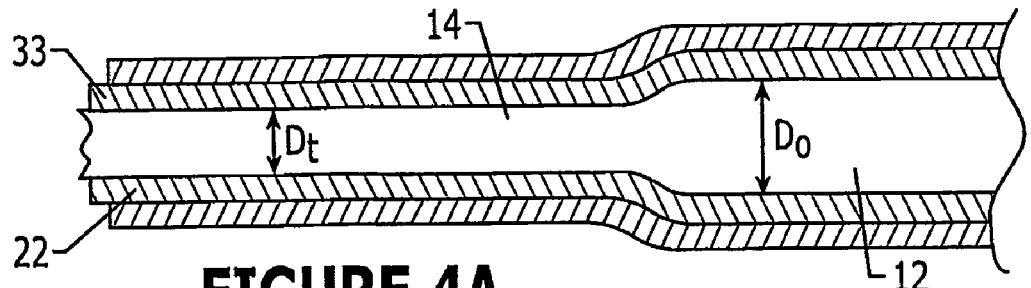
FIGS. 4A, 4B and 4C are partial cross-sectional views of a the edge region of a blister strip showing various potential constructions of the primary and secondary sealed areas wherein the secondary seal extends from the edge of the strip into the edge region.
Figure 4B:
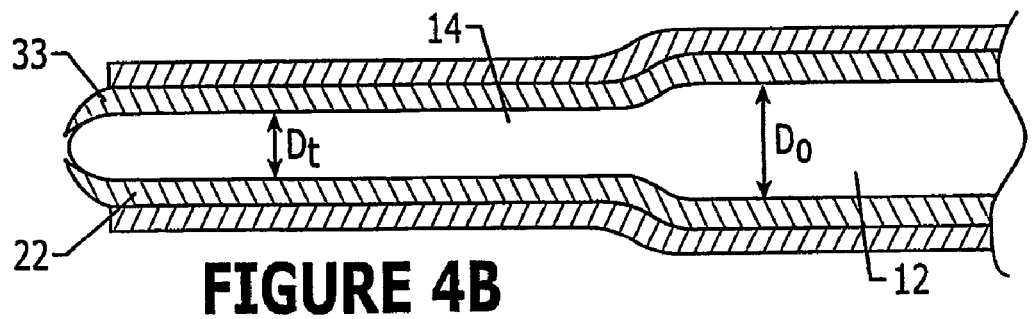
Figure 4C:
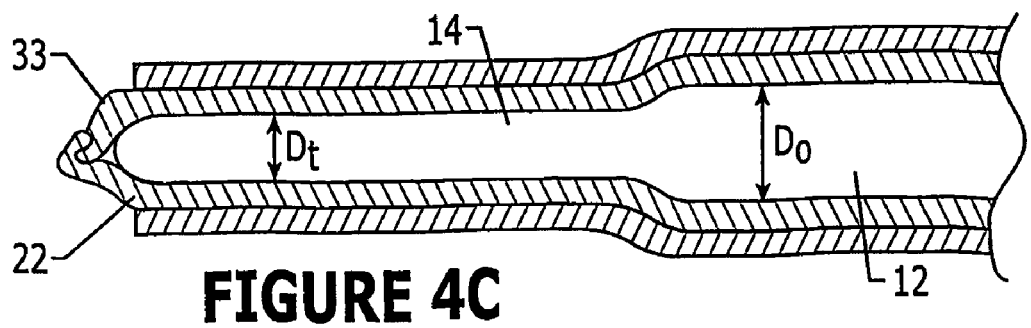
Figure 5:
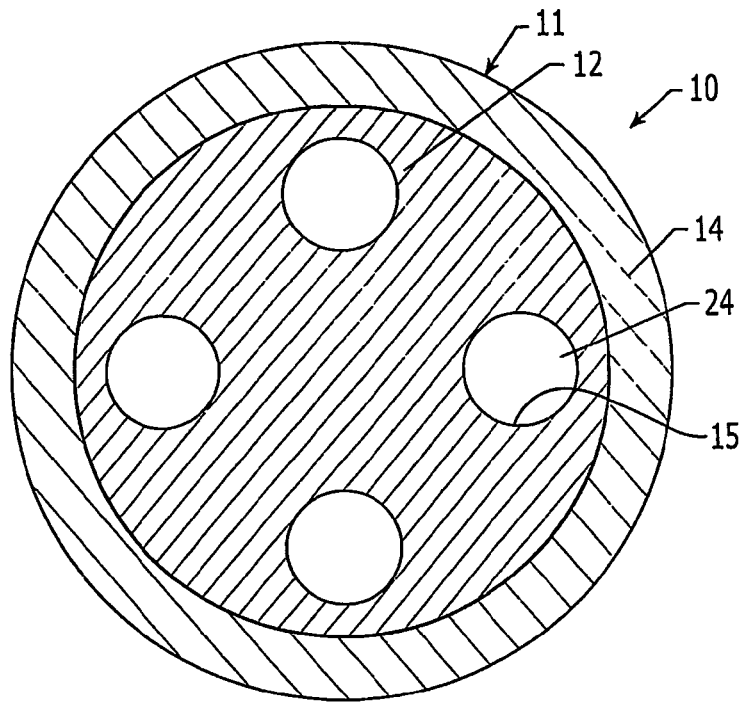
FIG. 5 is a top plan view of a disk-shaped laminate assembly having a primary and secondary seal.
Figure 6:
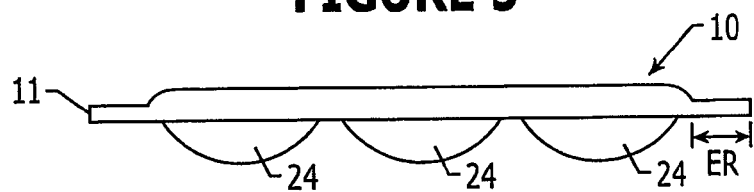
FIG. 6 is a side view of the laminate assembly of FIG. 5.

These same principles of secondary sealing may be applied in blister packs of non-elongate form, such as disks where the blisters are arranged in a circular array, as depicted in FIGS. 5A and 5B. FIG. 5A is a top view of a blister disk or laminate, assembly (10) containing four blister pockets (24). FIG. 5B is a side view of the blister disk. The blister disk has an edge (11). Each blister has a periphery (15) that surrounds each blister. A primary seal containing a fused region (12) is positioned between the between the periphery (15) of a given blister and the edge (11) of the blister disk. The secondary seal (14) is positioned between the primary seal and the edge of blister disk. As mentioned above, the secondary seal provides an additional barrier to moisture ingress. It may be formed before, after or during trimming to size the disk accordingly. It may comprise a compressed form (as in FIG. 4A), a tapered form (as in FIG. 4B) or a fused metallic layer form (as in FIG. 4C).

As will be appreciated, the secondary seal may be spaced from, adjacent to, or over the primary seal in the laminate assembly.

The invention is also directed to a method for forming a laminate assembly. In one embodiment the method comprises:
  a. providing a base sheet containing at least one blister having a product positioned therein, said base sheet comprising a first mating surface and providing a lid sheet comprising a second mating surface;
  b. positioning said lid sheet over said base sheet such that the second mating surface contacts said first mating surface;
  c. bonding said lid sheet and said base sheet to form a primary seal therebetween thus forming a primarily sealed laminate assembly, and
  d. bonding said primary sealed laminate assembly in a secondary sealing process to provide a secondary seal laminate assembly.

In another embodiment, the method for forming a laminate assembly, comprising the steps of:
  a. providing a base sheet and a lid sheet, said base sheet having formed therein a blister pocket containing a pharmaceutical composition and comprising a first mating surface; said lid sheet comprising a second mating surface, said base and lid sheets having a primary seal formed between said first and second mating surfaces to form a primarily sealed laminate assembly
  b. exposing a portion of said primary sealed laminate assembly to a bonding device to create a secondary seal therein.

More particularly, in one embodiment of the invention, the base sheet is transported via a transporting apparatus, for example a motorized feeding mechanism, to a conventional filling station via a base transporter. Each blister 12 is filled with a pharmaceutical composition, preferably, a dry powder pharmaceutical composition, via a conventional filling apparatus, such as that illustrated in U.S. Pat. No. 5,187,921, the teachings of which are specifically incorporated herein by reference. In parallel to this a lid sheet is transported via a transporting apparatus, for example a motorized feeding mechanism, to position the mating surface of the lid material over and facing the mating surface of the base sheet.

The base and lid sheets are then fused/bonded to create a primary seal. Primary sealing may be formed by the exertion of energy (e.g. thermal heating or high energy vibration) and pressure upon a lid and base sheet. Suitable mechanisms include use of a heated pneumatic press, such as a Rohrer-Collins platen press, or an ultrasonic welding device. Other approaches include adhesive bonding, hot metal bonding, hot metal welding, radio frequency welding and hot bar sealing. Heat-sealing may typically conducted at a temperature in the range of 150-250° C., more preferably, 210° C.-240° C. The heat-sealing step bonds the first bonding surface (23) of the base sheet (20), which comprises, for example PVC, and the second bonding or mating surface (34) of the lid sheet 30, to seal each blister 24 and, hence, the pharmaceutical composition contained therein. Ideally, the bonding creates a hermetic seal.

The primary seal may be continuous, or discontinuous. The primary seal, in a discontinuous configuration may form a grid-like pattern, or may be otherwise interspersed with regions of non-fused base and lid material. The primary seal may extend into be present in an edge region of the blister pack.

As will be appreciated by the preceding discussion, the secondary seal may be positioned at any desired location on the laminate assembly between the periphery of the blister and the edge of the laminate assembly. The secondary seal is, in one embodiment, formed in the edge region (ERs) of the laminate assembly. In a further alternative embodiment, the secondary seal is formed over the primary seal. In a still further embodiment, the secondary seal is positioned between the primary seal and the edge of the laminate assembly. In a further embodiment, the secondary seal is positioned along the edge of the laminate assembly.

Secondary sealing may be produced in any suitable fashion, as will be appreciated by those of ordinary skill in the art. The device for creating the secondary seal is preferably capable of thermal or high energy bonding, with or without pressure transfer. Suitable sealing approaches include, but are not limited to heat fusing under mechanical pressure and laser welding. In one embodiment, a suitable heat and pressure transfer device is a heated pneumatic press, such as hot bar sealer. One suitable hot bar press is a Rohrer-Collins platen press.

Figure 7:
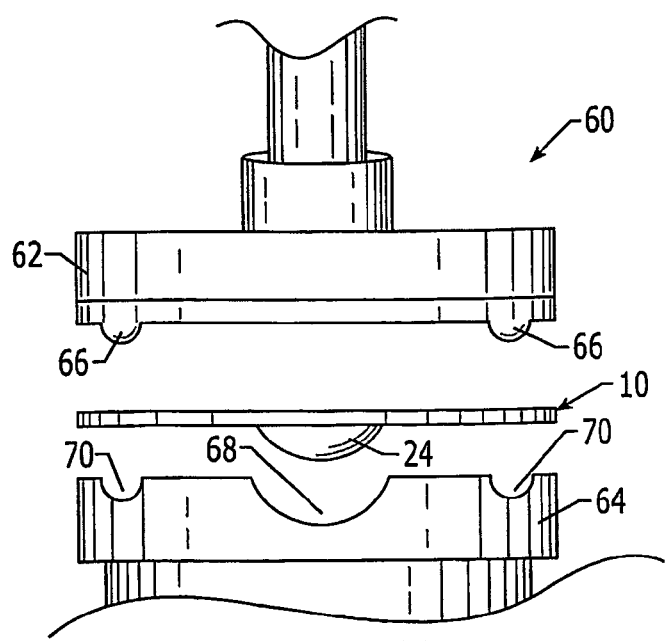
FIG. 7 is a partial side view of one type of heated pneumatic press.

FIG. 7 shows a diagrammatic view of one embodiment of a hot bar platen press (60). In the case of a platen press, it is possible to create a satisfactory secondary seal by equipping the press with an upper hot platen having a thermal head or plate (62) and a lower anvil (64). The upper hot press has one or more ridges (66) extending from the a thermal head (a.k.a plate) which correspond to where the secondary seal will be formed in the laminate assembly (10) when the head is compressed against the primary sealed laminate assembly which is itself contacting the anvil. The head may be flat (as show in FIG. 7) or may be rotary in form.

Referring again to FIG. 7, the anvil may be flat, or more preferably, may have surface contours configured to receive the blister portion (24) of the base sheet. In FIG. 7, the contouring for the blister takes the form of a blister trough (68). Further, if desired, the anvil may be contoured to have ridge indentations (70) corresponding to the location of the extending ridge(s) (66) of the upper platen. Similar to the thermal plate discussed above, the anvil may also be rotary in nature, having a annular anvil surface, which may be contoured as desired.

In use, the laminate structure (10) is placed on the anvil (64) such that blister (24) is placed in the blister trough (68). The ridged plate is heated and compressed onto the upper surface of the laminate assembly, such that ridges (66) are pressed against areas of the lid surface, compressing further the base and lid sheets against the anvil (and, in the case where the anvil has ridge indentations, into the ridge indentations (70)).

It will be appreciated that in an alternative form of this sealing apparatus, the blister strip could fed base side up between plate and anvil, and the blister trough would be placed between the ridges in the plate rater than in the anvil. In further embodiments, the laminate assembly may be passed between one or more rotary thermal heads and/or anvils.

In embodiments of the present invention incorporating a heated pneumatic press which incorporates rotary thermal heads/plates and/or anvils, the thermal head is wheel shaped and has a an annular surface adapted to pass thermal energy to the laminate assembly when the surface of the thermal head contacts the laminate assembly which is itself compressed against an anvil (rotary or non-rotary in design). The design of rotary surfaces for anvils/heads is discussed further herein in reference to ultrasonic welding designs referencing FIGS. 11A-11E. As will be appreciated, the rotary designs shown in FIGS. 11A-11E are also applicable to heated pneumatic press forms, and may be incorporated into thermal heads and/or anvils used in heated pneumatic presses. All variations on this theme are considered within the scope of the present invention. In a preferred embodiment or the rotary thermal head form, there would be two rotary wheels having annular surfaces which are positioned one above the other and are in very close proximity on their tangents. One the upper rotary head would be heated, and the lower roller (anvil) could be heated, or unheated. The rollers would have radial heads that would apply the heat & pressure to the strip, producing lines of secondary seal along each edge or other area where a secondary seal is desired.

Temperatures and pressures used are dependent upon the materials incorporated in the primarily sealed laminate assembly, and the depth and width of the secondary seal. The key parameters are platen temperature, the length of time the heated platen is pressed onto the assembly (dwell time) and the pressure at which the platen is pressed against the laminate and anvil (compression pressure). Typically, platen temperature is sufficient to create a fusible bond between the mating surfaces, or other portions of the laminate structure. For a PVC bonding layer, the temperature is between 150 and 250° C., more preferably, from 175° C. to 240° C., and most preferably between 180 and 220° C., e.g. approximately 185° C. The dwell time is and desirable range, preferable less than 1 minute, preferably less than 30 seconds, such as in the range of 0.25 to 5 seconds, such as from 0.75 to 3 seconds. The compression pressure is desirably less than 10 bar, more appropriately less than 5 bar, such as from 3.5 to 1 bar. The compression pressure can be measured in any suitable manner, including but not limited to the pressure exerted upon the plate by a compression device such as a piston, or by measuring the force exerted on the laminate assembly or anvil by the thermal head.

Secondary seal width is dependent on the plate ridge width coming into contact with laminate assembly. The plate ridges in the hot bar are desirably designed to create a seal which is at least 0.05 mm wide, more desirably between 0.1 and 2.5 mm wide, and most preferably between 0.25 and 1.5. The secondary seal could, if desired, completely cover the portion of the edge region between the blister periphery and the edge of the laminate assembly.

The placement of the seal may be at the very edge of the laminate assembly, or may be distanced from the edge of the laminate assembly. In a one preferred embodiment, the secondary seal is positioned at a distance of 0.05 mm or more from the edge of the blister.

Preferably, the creation of a secondary seal, or fusing and shearing to create such seal does not materially impair or impede the mode employed to access the pharmaceutical composition contained in the blisters. In modes include piercing the lid (and/or base) this doesn't pose much of a concern. It is however more important when peeling the lid from the base exposes the content of the blister in the laminate assembly. In these forms, it may be desirable to provide a "peelable bond", i.e., a bond that undergoes adhesive failure at the bonding interface, to expose the pharmaceutical composition contained in the blister(s).

In further embodiments, primarily sealed or secondarily sealed blisters may undergo trimming, wherein a portion of the edge region is removed to resize the blister to a given width or length for use in a given device. Secondary sealing may be employed after removal of a portion of the laminate assembly, or before or during this trimming process. By employing a secondary seal, trimming is less prone to compromise the hermaticity of the seal of the laminate assembly, as the secondary seal may be positioned directly in or adjacent to the trimmed region, or between the area of the trimming and the blister pocket.

Figure 8:
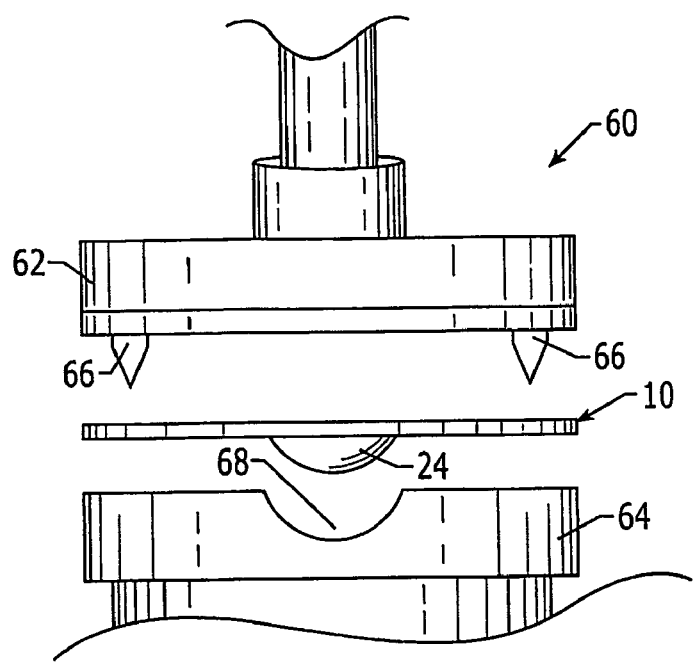
FIG. 8 is a partial side view of one type of heated pneumatic press having an angled ridge.

Simultaneous trimming and secondary sealing may be conducted using the heated pneumatic press. In such instances, the plate ridges (66) are modified to form a sharp edge, as shown in FIG. 8. As the platen descends onto the lid of the laminate assembly, the sharp edge presses against and cuts through the laminate assembly, fusing the base and lid mating surfaces into a secondary seal during this process. Trimming in this instance is due to mechanical shearing, whereas sealing is the product of compression and heating.

Secondary sealing may also be undertaken using an ultrasonic welding apparatus. In a particular mode of operation, the ultrasonic welder, can also trim and simultaneously create the secondary seal. Such an ultrasonic welding apparatus is shown in FIGS. 9 and 10.

Figure 9:
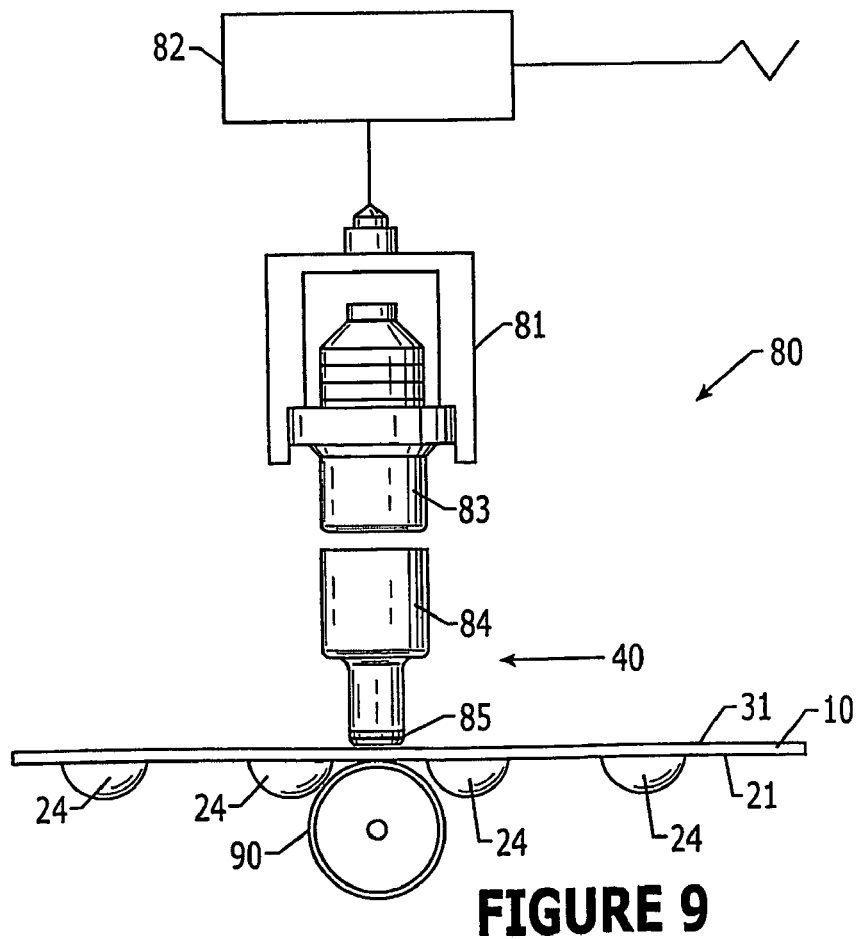
FIG. 9 is a side view of an ultrasonic welding/sealing device.

In FIG. 9, there is shown one embodiment of an ultrasonic sealing mechanism useful in the present invention. As discussed in detail below, in a preferred embodiment, the ultrasonic sealing mechanism comprises an ultrasonic welder (80). Ultrasonic welder (80) generally includes a housing (86) containing a piezoelectric (or magneto restrictive) transducer (81) that converts electrical energy supplied by a generator (82) into mechanical vibration. A booster (83) modulates (increases or decreases) the amplitude of the vibration(s) and transfers the energy to a horn (84), which preferably includes a horn tip (85) disposed on one end thereof. The horn contacts one surface (preferably, the top surface of the lid) of the laminate assembly, and compresses the laminate assembly against an anvil (90). Anvil (90) supports the opposite surface of the laminate assembly, in this case the bottom surface 21 of the blister sheet.

The anvil (90) can either be a rotating wheel or roller, as shown in FIGS. 9 and 10, or a fixed member similar to the anvil (64) depicted in FIGS. 7 & 8. The anvil contacts and supports the underside of the laminate assembly. The rotating wheel anvil configuration can be a single wheel positioned between the blister and the edge of the laminate assembly, as in FIGS. 9 and 10, or can be a plurality of wheels positioned on either side blisters (24), as in FIG. 11A,B, C or D.

The ultrasonic unit (80) capable of establishing and controlling a set gap between the horn tip (85) and the anvil (90) at a predetermined distance which can be chosen to expressly fit (i) the fusing mode (e.g., near field, far field, etc.), (ii) the nature of the laminate material(s) and (iii) the thickness of the blister strip. The ultrasonic unit can also include a mechanism for establishing and controlling a contact pressure between the horn (85) and anvil (90) that similarly can be tailored to effectuate efficient fusing, or shearing and fusing, of the blister strip.

In the embodiments shown in FIGS. 11A and 111B, and FIGS. 11D and 11E, each rotary anvil comprises an axle (92) having an axis of rotation extending through (shown as a broken line) and one or more rotary anvils (90). The rotary anvils have sides extending generally tangentially from said axis of rotation, and ending at an annular edge (91). In the case of paired rotary anvils, each is spaced from the other, and the space between the rotary elements being designed to accommodate the length (L1) of each blister, such that the annular edge is the anvil surface falling within the edge region to assist in forming the secondary seal. In use, the portion of the annular edge(s) of the rotary elements contacting the laminate structure of the blister strip forms the secondary seal. (As mentioned previously, the FIGS. 11A-11E can be equally applicable to a description of a heated pneumatic press device where the rotary elements can be employed as ridge of the plate(s) and/or the anvil(s)).

Figure 11A:
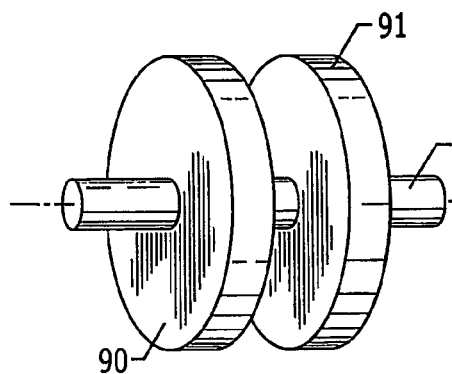
FIGS. 11A, 11B, 11D and 11E are various perspective views of rotary anvils/heads.
Figure 11B:
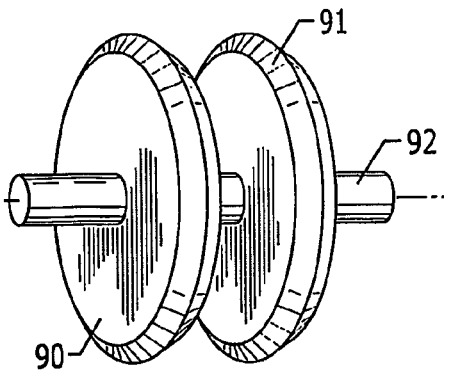

The design of rotating anvil (90) dictates whether the welding apparatus seals, or both cuts and seals the laminate assembly. Embodiments of the rotating anvil designed to form a secondary seal without trimming the laminate assembly have a flattened annular edge surface (91), as depicted in FIG. 11A. Embodiments for forming a tapered seal, or designed to both shear the strip and form the secondary seal, are equipped with annular edge(s) (91) that are tapered or which form a sharp angled edge, as will be appreciated by those of ordinary skill (see 11B, 11D and 11E). The slope of the angle of the ridge may be positive, negative or both (such as with a double-edged ridge (FIGS. 11B and 11C)). Moreover, the angles of a multi-angled ridge may be the same or different.

Figure 11C:
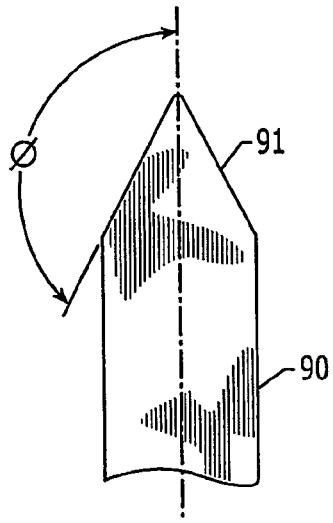
FIG. 11C is a perspective view of a ridge of an anvil or head having two-edges.
Figure 11D:
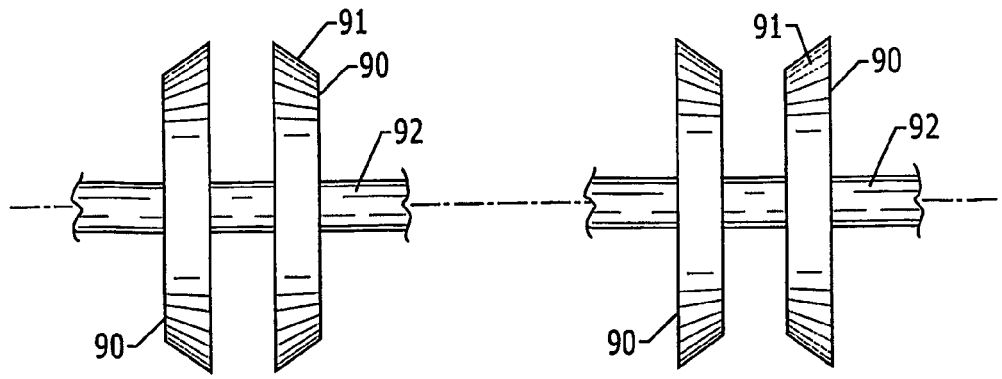
Figure 11E:
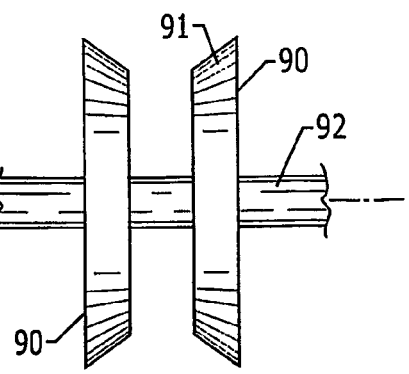

FIG. 11C, shows the edge of a sharp angled embodiment of an anvil (90) according to the invention. As illustrated in FIG. 11C, in the noted embodiment, the annular edge (91) of the anvil (90) is substantially "knife edge shaped", forming an angle Ø with the vertical axis. As can be appreciated, an angled edge will be any edge with an angle greater than 90° (measured from the vertical line shown). A sharp angled annular edge would be, for example, in the range of approximately 100°-140°, more preferably, 110°-1300. (Angles are given as positive numbers, but may also to be understood as covering both positive of negative slopes). Applicant has found that the noted edge profile provides optimum, continuous shearing and fusing during processing. Further annular edge designs include circular arcs, exponential curves, and combinations of such (flat, angled and/or curved) features, depending on the desired finish of the edge of the laminate assembly.

The width of the secondary seal is dependent on the width of the portion of the annular surface edge of the rotary anvil coming into contact with the laminate assembly. As mentioned above, this width can range from the entirety of the edge region between the blister periphery and the edge of the laminate assembly, to a very small region in this area.

Where simultaneous shearing and fusing is employed, the ultrasonic shearing of a blister strip includes thermal and mechanical shearing components. The thermal component substantially facilitates fusing the polymeric materials (e.g., PVC) that are employed in the blister strip laminate(s), while the mechanical component substantially facilitates or effectuates shearing of the aluminum foil. The ultrasonic head uses vibration to work-harden the aluminum foil to the point of brittle fracture or failure, while the knife edge of the shearing anvil facilitates cutting.

According to the invention, a frequency in the range of 10-100 kHz can be employed to ultrasonically fuse, or shear and fuse, a laminate assembly of the invention. Preferably, the frequency employed is in the range of approximately 20-60 kHz. More preferably, the frequency employed is either approximately 20 kHz or approximately 40 kHz.

The outcome of ultrasonic welding in terms of whether material is trimmed and sealed, or merely sealed, may also be dependent on other factors. For example, the feed rate at which a strip is passed between the welding head 85 and the anvil 90, is believed to potentially play a role in the form of seal created. Further parameters include the material of construction of the laminate assembly, the power level of the welding apparatus, the degree of power boost, and the pass speed of the blister strip between the welding head and the anvil. Selection and optimization of these parameters is within the skill in the art.

One suitable ultrasonic welder is a Dukane Model 210 20 kHz plunge welder, available from Dukane Corp, St. Charles, Ill. In this device, the power level is preferably greater than 50 Watts, preferably between 55 Watts and 80 Watts.

It is believed that power, boost, amplitude and pass speed can be optimized to seal the primarily sealed blister strip, as in FIG. 4A. By modifying (decreasing) the gap between horn tip, or by increasing the power boost, or by modulating the pass speed, the sealing device can be used to create a tapered edge seal, as in FIG. 4B. Lastly, by increasing the pass speed and modulating boost, it may be possible actually couple the metallic layers of the base and lid sheets to create a metallic seal along the edge (or within the edge region) around the bonded materials (as in FIG. 4C), thereby creating a further improvement in the integrity of the continuous or discontinuous edge-seal.

As will be appreciated by one having ordinary skill in the art, a similar approach to that described above is equally applicable to different shaped laminate assemblies having at least one edge region, including substantially circular shaped laminate assemblies, such as the Rotadisk®, marketed by GlaxoSmithKline.

Figure 12:
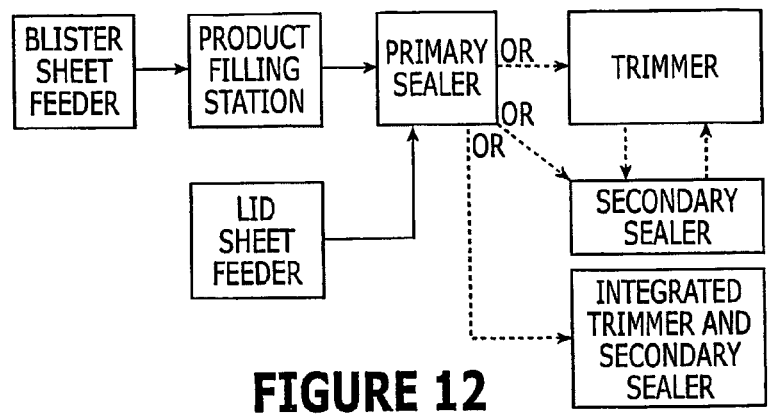
FIG. 12 is a flow chart of the system for forming a blister assembly of the present invention.
Figure 13:
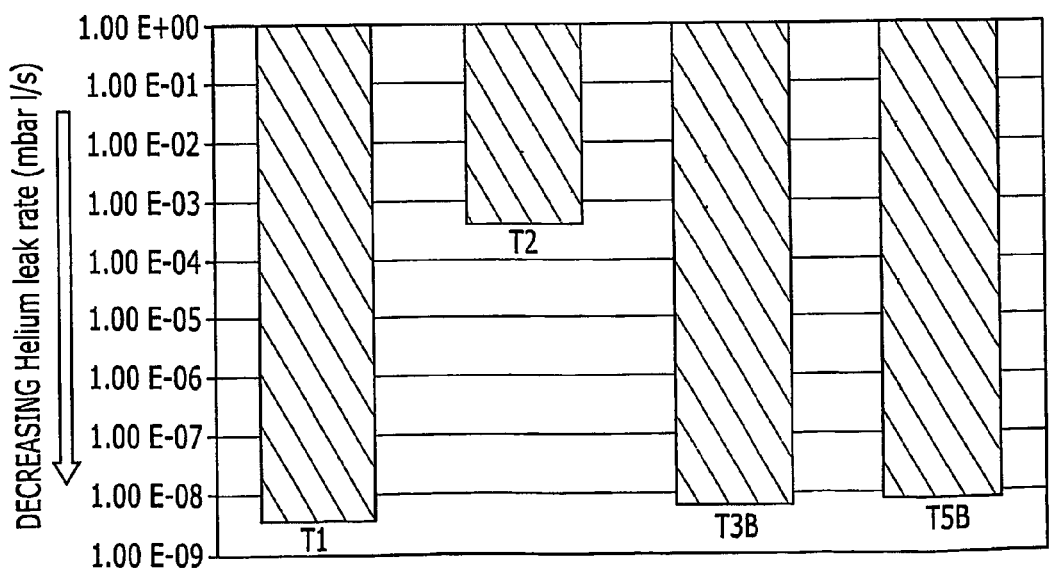
FIGS. 13, 14A and 14B are graphs comparing helium intrusion results for various laminate assemblies.
Figure 14A:
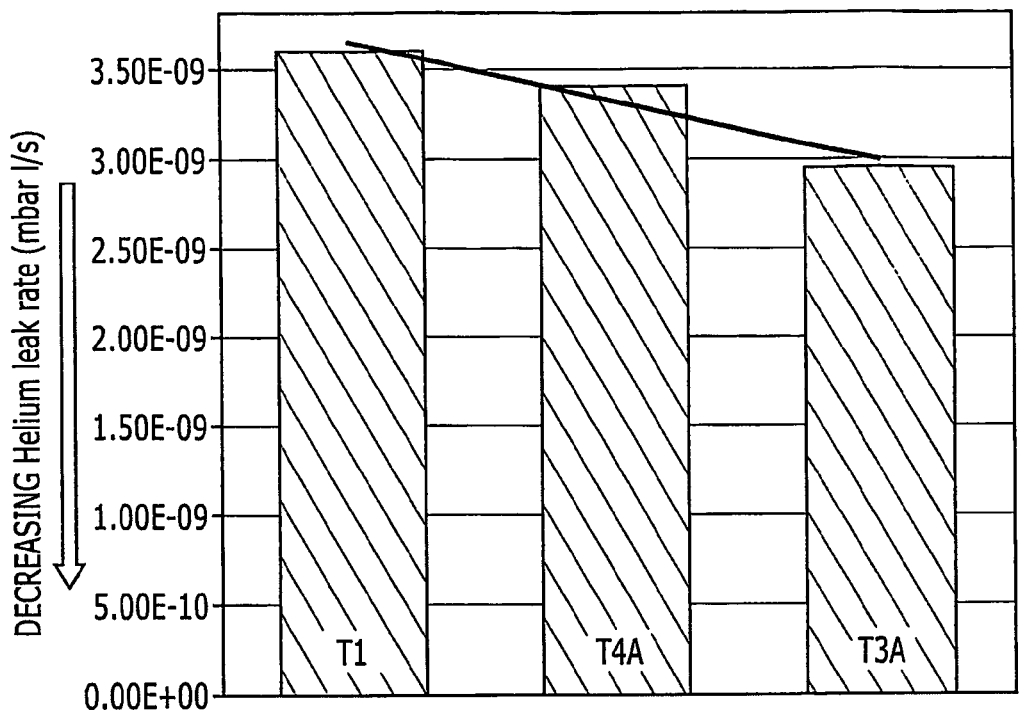
Figure 14B:
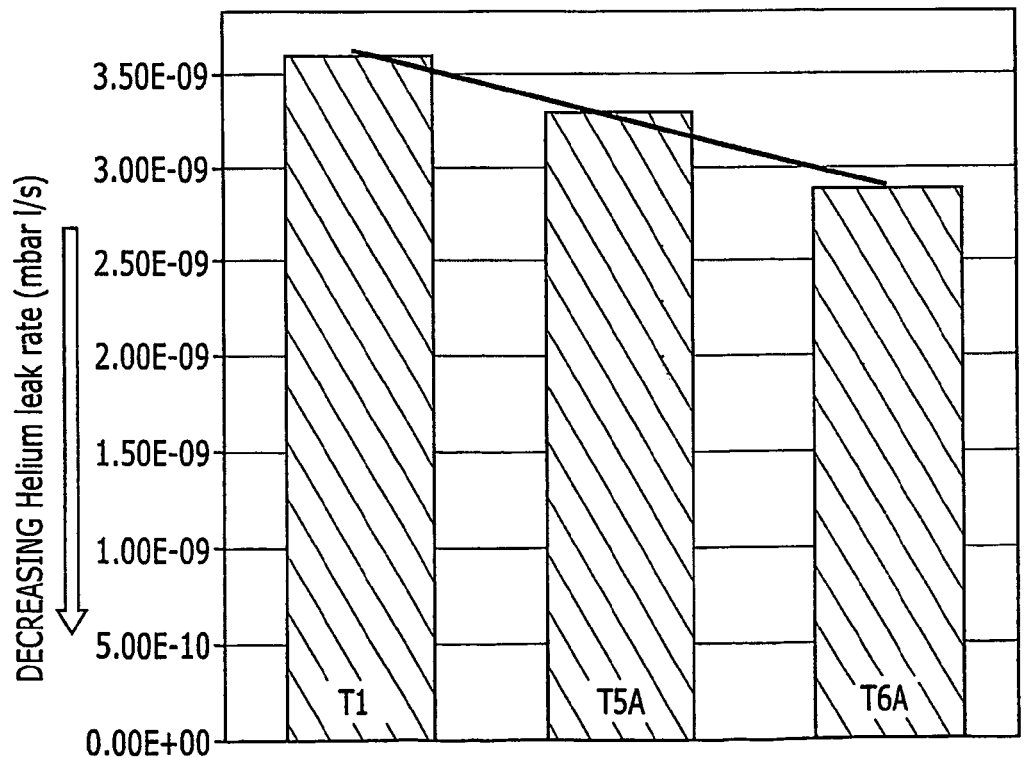

The above method may be applied into a system for secondarily sealing laminate assemblies. As depicted in FIG. 12, the system comprises a secondary sealing apparatus comprising a source of bonding energy, said bonding energy being directed onto a primarily sealed laminate assembly and causing formation of a secondary sealed laminate assembly.

In one embodiment, the system includes a laminate trimmer, said laminate trimmer being distinct from said source of secondary sealing apparatus. In a second embodiment, said laminate trimer is integral with said secondary sealing apparatus, where said secondary sealing apparatus both trims and secondarily seals said primarily sealed laminate assembly. In further embodiment, the laminate trimmer comprises a mechanical shear. In a still further embodiment, the laminate trimmer comprises an ultrasonic horn contacting an anvil.

In one embodiment, the source of bonding energy comprises a heated pneumatic press. In a further embodiment, the heated pneumatic press comprises a hot bar platen press. In a still further embodiment, the source of bonding energy comprises an ultrasonic welding apparatus.

In a further embodiment, the secondary seal is substantially continuous. In a still further embodiment, the secondary seal is discontinuous.

In a further embodiment of the present invention, the secondary sealer is adapted to fuse the metallic components of the base sheet and lid sheet of a primarily sealed laminate assembly to create a substantially continuous secondary seal therein.

In a further embodiment, the system comprises a feeder for feeding a primarily sealed laminate assembly to a secondary sealing apparatus. In one embodiment, the feeder comprises a motor drive for transporting said laminate assembly to said secondary sealing apparatus.

In another embodiment of the present system, the feeder feeds the primarily sealed laminate assembly from a primary seal applicator. In a further embodiment, the primary seal applicator creates a primary seal between a base sheet and a lid sheet, thus sealing a one or more products in a one or more blisters formed in said base sheet. In one embodiment, the primary seal is created between a first mating surface on said base sheet and a second mating surface on said lid sheet. In one embodiment, the primary seal applicator creates a grid-like primary seal between a base sheet and a lid sheet.

In one embodiment, the primary seal applicator is a heated pneumatic press. In a further embodiment, the primary seal applicator is an ultrasonic welding apparatus.

In one embodiment, the one or more products are metered from a product delivery apparatus.

In one embodiment, the blister sheet is supplied to the product delivery apparatus from a base sheet feeder. In a preferred embodiment, base sheet is contained within or is fed into said base sheet feeder.

In a further embodiment, the lid sheet is supplied to the primary seal applicator from a lid sheet feeder. In a preferred embodiment, lid sheet is contained within or is fed into said lid sheet feeder.

As will be appreciated by one having ordinary skill in the art, the above described laminate assembly, method and system provides an effective and efficient means for forming dry powder pharmaceutical composition packaging in the form of laminate assemblies having primary and secondary seal regions that enhance the seal integrity of the packaging and, hence, the stability of the dry powder pharmaceutical composition, as can be appreciate from the following examples:

A. EXAMPLES

1. Type 1 Strips: Preparation of Primary Sealed Laminate Assemblies 14-blister base sheets were volumetrically filled with a dry powder drug formulation comprising (approximately 100 micrograms fluticasone propionate, approximately 50 micrograms salmeterol xinafoate, remainder of 12.5 mg total dose comprising miconized lactose). A lid sheet was placed over the base sheet, such that the bonding surface of the lid sheet was facing the corresponding mating surface of the base sheet. The base and lid sheets were sealed together in primary sealing using a standard latticed pattern. The latticed heat sealing tool was attached to a Rohrer-Collins pneumatic press heated to 185° C. and operating at 3 bars of pressure and engaged to seal for 1 second in duration.

2. Type 2 Strips: Preparation of "Leaky" Primary Sealed Laminate Assemblies

In order to determine the effect of edge-sealing on blister strips which contain defects, a number of elongate blister strips containing deliberately fashioned leak channels in their primary sealing were made to serve as controlled "leakers." The leaky primary sealed laminate assemblies were prepared by filling a 14-blister base sheets the same dry powder drug formulation as non-leaking primary laminate assemblies discussed above. A lid sheet was placed over the base sheet, such that the bonding surface of the lid sheet was facing the mating surface of the base sheet. The lid and base were then positioned in a heated Rohrer-Collins pneumatic press equipped with a leak-channeled heat tool plate. The leak plate had engraved therein 0.25 mm in width channels which extended from each blister to the edge of the strip. The press plate was heated to 170° C. and operated at 2 bars of pressure to seal for 0.5 seconds in duration. The resulting blister packs contained intentionally leaking primary seals.

3. Type 3A Strips: 1.5 mm Secondary Sealed Type 1 Blisters

Secondary sealing was applied by thermal means using 1.5 mm wide edge-seals applied using a Rohrer-Collins pneumatic press heated to 185° C. operating at 2.5 bar pressure for 1 second.

4. Type 3B Strips: 1.5 mm Secondary Sealed Type 2 Blisters

Secondary sealing was applied by thermal means using 1.5 mm wide edge-seals applied using a Rohrer-Collins pneumatic press heated to 185° C. operating at 2.5 bar pressure for 1 second.

5. Type 4A Strips: 0.5 mm Secondary Sealed Type 1 Blisters

Secondary sealing of Type 1 laminate assembly was applied by thermal means using 1.5 mm wide edge-seals applied using a Rohrer-Collins pneumatic press heated to 185° C. operating at 2 bar pressure for 1 second.

6. Type 5A Strips: Low Energy Ultrasonically Sealed Type 1 Blisters

Type 5A Strips were prepared by secondarily sealing Type 1 laminate assemblies with an ultrasonic welding means using edge-seals of 0.75 mm width applied at 20 kHz using Dukane ultrasonic welder using a 1:1 booster with a flat-faced titanium sonotrode having a carbide face. The welder operates at a power input level between 55 W-80 W. The sonotrode oscillates at an amplitude of 45 µm against a tapered rotating anvil which rotates at a feed rate of 24 ft/min.

7. Type 5B Strips: Low Energy Ultrasonically Sealed Type 1 Blisters

Type 5B Strips were prepared by secondarily sealing Type 2 laminate assemblies with an ultrasonic welding means using edge-seals of 0.75 mm width applied at 20 kHz using Dukane ultrasonic welder using a 1:1 booster with a flat-faced titanium sonotrode having a carbide face. The welder operates at a power input level between 55 W-80 W. The sonotrode oscillates at an amplitude of 45 µm against a tapered rotating anvil which rotates at a feed rate of 24 ft/min.

8. Type 6A Strips: High Energy Ultrasonically Sealed Type 1 Blisters

Type 6A Strips were prepared by secondarily sealing Type 1 laminate assemblies with an ultrasonic welding means using edge-seals of 0.75 mm width applied at 40 kHz using Dukane ultrasonic welder using a 1:1 booster with a flat-faced titanium sonotrode having a carbide face. The welder operates at a power input level between 55 W-80 W. The sonotrode oscillates at an amplitude of 45 µm against a tapered rotating anvil which rotates at a feed rate of 12 ft/min.

B. Experimental Method

1. Liquid Dye Immersions:

Laminate Assembly is immersed in an aqueous dye formulation under a vacuum (25-28 inches mercury/850-950 mbar) for 30 seconds. The pressure is released, and the blister remains submerged for 60 additional seconds. The blister is removed, rinsed, dried and the lid or blister cover is removed to expose the blister contents. Macro-leakage is exemplified if dye is present in the blister contents.

2. Helium Integrity Testing:

Helium integrity is a detection method used for a wide range of industry research applications for testing seal integrity. In a helium integrity test, a helium tracer is detected by a dedicated mass spectrometer 'tuned' only to detect helium gas. Mass spectroscopy relies on separation of the helium ions from ambient or background ions, by the use of magnetic and/or electric fields and allows ultra-trace sensitive detection by an ion collector down to sub part-per-trillion [1 in $10^{12}$ parts] levels. Helium integrity detection is the most sensitive of the gas tracer integrity detection methods because of the very high inherent sensitivity of the mass spectrometry detection method.

A suitable helium intrusion testing apparatus includes a helium input mechanism and a helium detector. A blister strip or section thereof is positioned between these two features in a sealed fashion, such that only helium passing through the seal of the laminate assembly is picked up by the detector. As helium is passed into the input chamber at a controlled rate, the rate at which helium gas leaks or permeates through the blister seal can then be determined and a measure of helium permeability of the laminate seals obtained. The helium leak or permeation rate can be determined by Mass Spectrometric detection of the transmitted helium gas down to levels of $1\times10^{-11}$ atm cc.s$^{-1}$.

3. Water Vapor Ingression

Samples were exposed to stability studies where the laminate assembly sample was stored under elevated temperature and relative humidity parameters for prolonged periods of time to determine the extent that chemical or physical stability is effected by accelerated degradation conditions. The conditions used were 40 degrees Celsius and 75% relative humidity.

The samples were then opened and the aerodynamic behavior of the contents of the exposed laminate assemblies was then determined by aerosolizing the blister contents in an Andersen Series 20-800 Mark II eight-stage non-variable cascade impactor operated at 60 l/min.

C. Experiments

1. Liquid Dye Immersion

All blister types were exposed to liquid dye immersion testing. Upon opening of blisters after rinsing and drying, no dye was found in any of the blisters, indicating laminate assemblies were free of macro-leaks.

2. Secondary Sealing and Effect on Helium Intrusion a. Primary sealed blisters compared to "leakers" and secondarily sealed "leakers":

FIG. 13 plots helium intrusion for Type 1, Type 2, Type 3B and Type 5B laminate assemblies. As shown in FIG. 13, the helium leak rate associated with the Type 2 leaking blister strip was $5.5\times10^{-4}$ mbar Vs. After edge-sealing, the helium leak rate of the Type 3B strips dropped to $5.7\times10^{-9}$ mbar Vs, and the Type % b strips dropped to $7.7\times10^{-9}$ mbar Vs. In either case, edge-sealing resulted in a five orders of magnitude drop in leak rate, or roughly 100,000× diminishment in helium leak rate associated the "repaired" Diskus strips, bringing these strips in line with the Type 1 non-leaking leaking blisters, indicating that secondary sealing is useful in "repairing" leakage in laminate assemblies.

b. Primary Sealed Vs Secondary Sealed Laminate Assemblies

FIGS. 14A and 14B show the results of helium intrusion plots of Type 3A, 4A, 5A and 6A secondarily sealed laminate assemblies, as compared to a primary sealed Type 1 blister strip. Plots show greater degree of intrusion in the absence of secondary seals in a comparison of Type 1, Type 4A and Type 3A seals (FIG. 14A) and in a comparison of Type 1 strips vs Type 5A and 6A strips (FIG. 14B). With hot bar seals, the degree of integrity increases with increasing seal width (FIG. 13A) and with secondary seals created by high energy ultrasonic welding as opposed to low energy ultrasonic welding.

These secondarily sealed laminate assemblies gave approximately 20% difference in results in helium integrity detection regardless of method of manufacture. As depicted, the Type 5A strip resulted in a drop in helium leak rate from $3.6\times10^{-9}$ mbar l/s to $2.9\times10^{-9}$ mbar l/s as compared to the non-edge-sealed Type 1 strip. Similarly, the thermally secondarily sealed Type 3A strip resulted in an identical drop in helium leak rate from $3.6 \times 10^{-9}$ mbar l/s to $2.9 \times 10^{-9}$ mbar l/s as compared to the non-secondarily-sealed Type 1 strip.

These results indicate an improvement in seal integrity of secondarily sealed strips over solely primarily sealed strips.

3. Cascade Impaction

Figure 15:
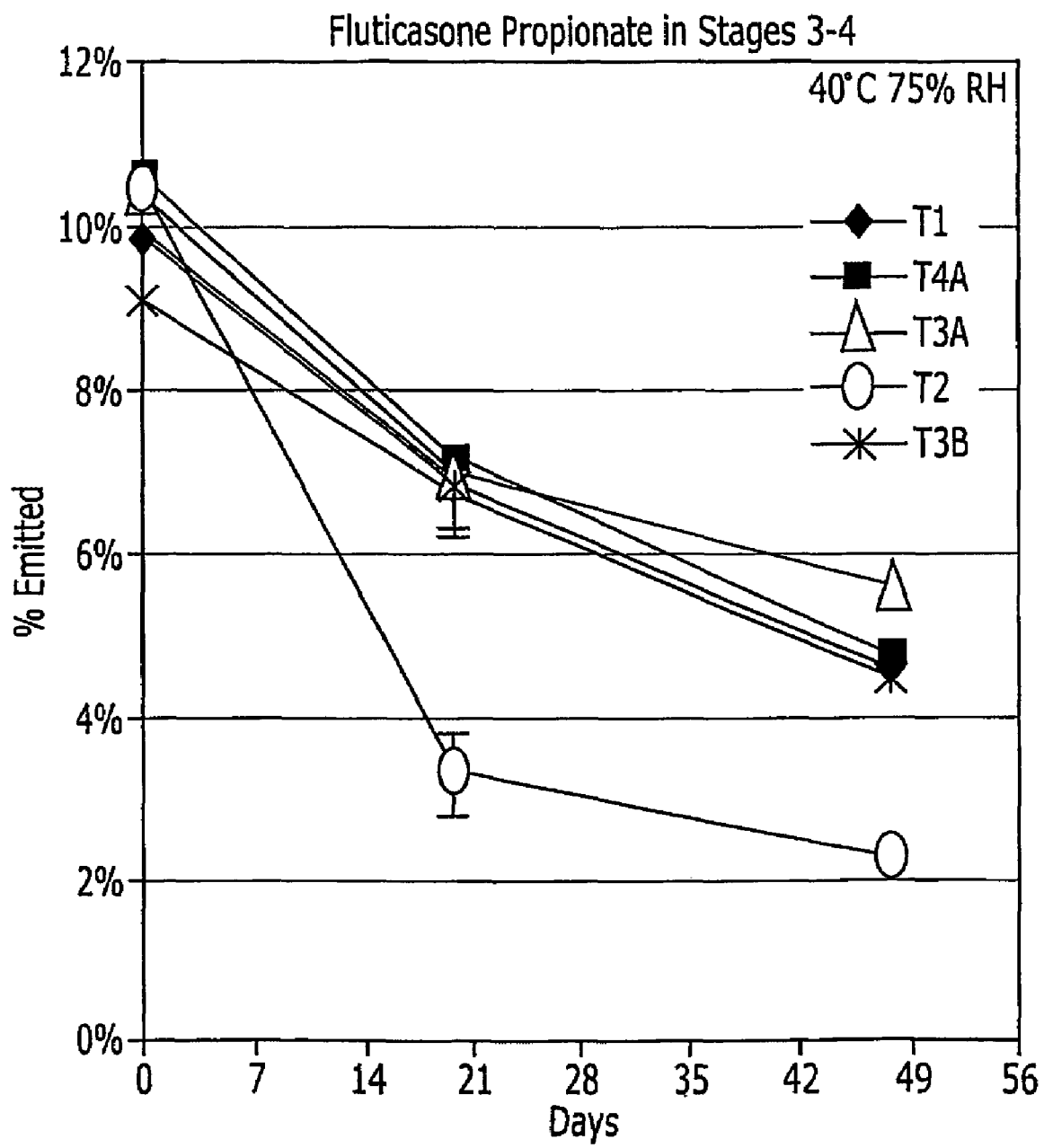
FIGS. 15 and 16 are graphs of cascade impaction data comparing various laminate assemblies after storage in accelerated conditions over time.
Figure 16:
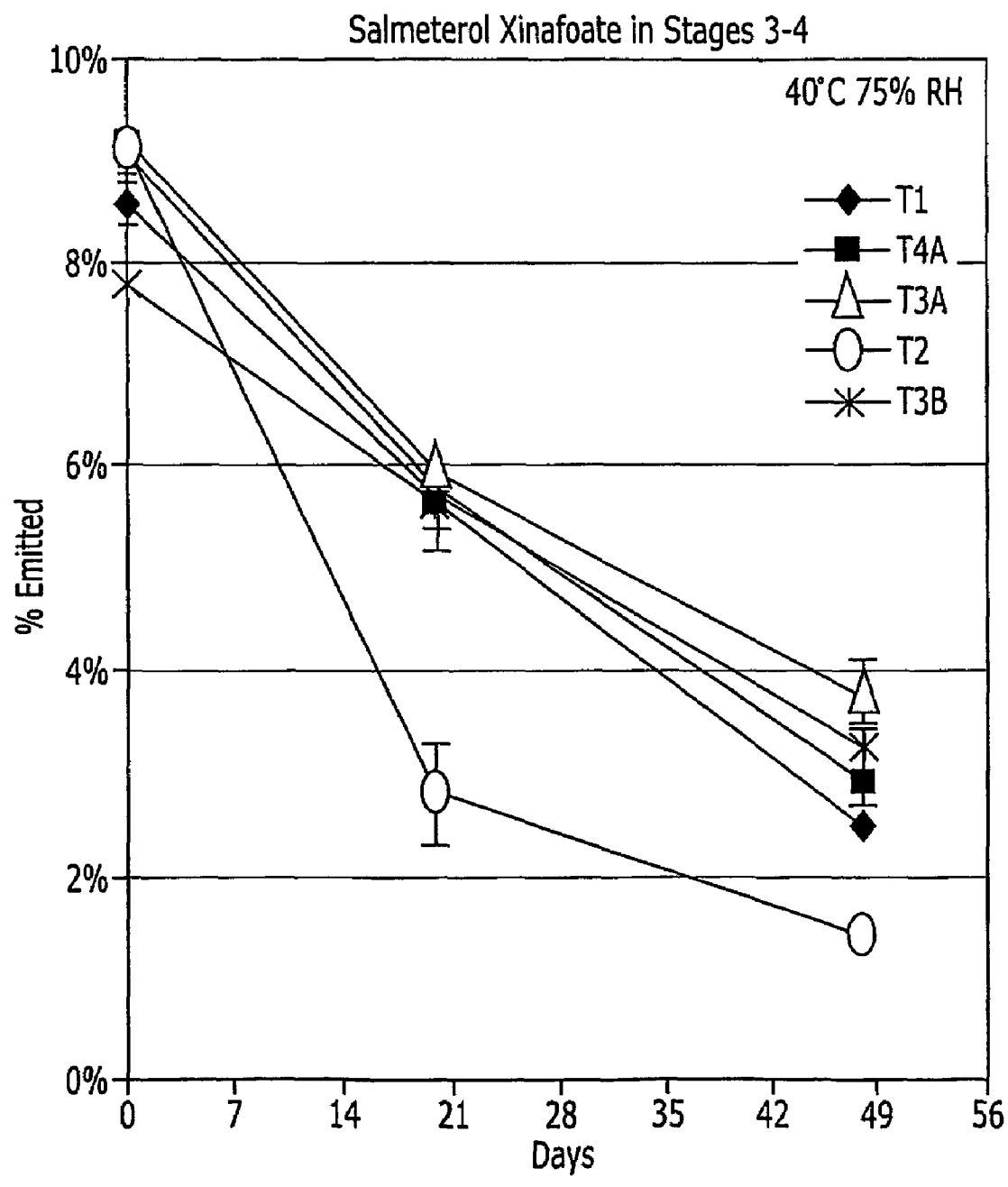

FIGS. 15 and 16 depict the cascade impaction performance of Type 1, 2, 3A, 3B and 4A blister strips in terms of respirable fraction of fluticasone propionate (FIG. 15) and salmeterol xinafoate (FIG. 16) after being placed on stability over time. The fraction which was studied in these experiments focused on that fraction of drug recovered in Stages 3 and 4 of the Andersen Cascade Impactor, an important measurement for regulatory inquiries by the US Food and Drug Administration when reviewing inhaled pharmaceuticals. This fraction in the respirable dose is widely regarded as the efficacious portion of the administered dose by the US FDA, as it contains drug particles with effective cut-off diameter (the maximum diameter at which 50% of particles that size will pass through to a lower stage) between 1.4 μm-2.3 μm.

As shown in FIGS. 15 and 16, secondary sealing in the Type 3A, 3B and 4A strips resulted in approximately 50% gain in percent emitted respirable dose for salmeterol xinafoate (FIG. 16) and a 25% gain in percent emitted respirable dose for fluticasone propionate (FIG. 15) as determined an Andersen Cascade Impaction study at an early time point of 3 weeks storage under 40° C./75% RH accelerated conditions when compared to the leak control, Type 2 strip. Even more significantly, the Type 3A, 3B and 4A strips displayed at least 150% the emitted respirable dose response at longer storage times of 7 weeks at the same conditions when compared to the leak control, Type 2 strip.

Cascade impaction data was not so favorable with ultrasonically sealed blisters and has been omitted, largely because it is believed the welding pass speed was too low, and somehow adversely impacted physical characteristics of the blisters or their contents. It is believed that lowering power or increasing pass speed in the ultrasonic assembly would result in suitably designed laminate assemblies that would show results similar to those obtained in the previous helium and vapor studies.

The data generated indicates that secondary sealing is effective in further enhancing the helium integrity and respirable dose response from blister strips sealed in a normal primary sealing fashion. That is, the effect of applying secondary edge-seals to blister strips which do not contain intentionally-crafted leaks and which were sealed using the standard latticed heat seal pattern results further gains in pack integrity. Moreover, studies conducted with the Type 3B strips indicate that once a leaking strip is healed through secondary sealing, (in this case by hot bar sealing) it exhibits significantly improved ability to protect the blister contents from material ingress compared to their unhealed counterparts—thus secondary sealing "heals" of "cures" leaking and it effects. In effect Type 3B strips behaved similar to a primary sealed Type 1 blister, demonstrating the "curative" effect of secondary sealing.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A method for forming a laminate assembly, comprising the steps of:
    a. providing a base sheet and a lid sheet, said base sheet having formed therein a blister pocket containing a pharmaceutical composition and comprising a first mating surface; said lid sheet comprising a second mating surface, said base and lid sheets having a primary seal formed between said first and second mating surfaces to form a primarily sealed laminate assembly;
    b. exposing a portion of said primary sealed laminate assembly to a bonding device to create a secondary seal therein;
    wherein said bonding device is an ultrasonic welder, said ultrasonic welder comprising a welding sonotrode and an anvil, and said primary sealed laminate assembly is positioned therebetween to form said laminate structure,
    wherein said anvil comprises at least one rotary anvil defining an annular edge, and said avil comprises an axle having an axis of rotation and a pair of rotary anvils; a first rotary anvil having a first side extending generally tangentially from said axis of rotation and having a first annular edge; and a second rotary anvil having a second side extending generally tangentially from said axis of rotation and having a second annular edge; said first and second rotary anvils being spaced from each other, at least a portion of said first and second annular edges contacting said laminate structure during the creation of said secondary seal.

2. The method of claim 1, wherein at least one of said first or said second annular edges is substantially flat in cross-view.

3. The method of claim 1, wherein at least one of said first or said second annular edges is angled in cross-view.

4. The method of claim 1, wherein at least one of said first or said second annular edges is curved in cross-view.

5. The method of claim 1, further comprising the step of removing a portion of said primarily sealed laminate assembly before, during or after secondary sealing.

6. The method of claim 5, wherein said step of removing a portion of said primarily sealed laminate assembly occurs substantially simultaneously with the creation of said secondary seal.

7. The method of claim 5, wherein said step of removing a portion of said primarily sealed laminate assembly occurs as a result of mechanical cutting.

8. The method of claim 5, wherein said step of removing a portion of said primarily sealed laminate assembly is achieved with an ultrasonic welder.

9. The method of claim 5, wherein said base sheet comprises a base metal layer, and said lid sheet comprises a lid metal layer, said base and lid metal layers are at least partially fused to each other during creation of said secondary seal.

10. The method of claim 1, wherein said base sheet comprises a base metal layer, and said lid sheet comprises a lid metal layer, said base and lid metal layers are at least partially coupled during creation of said secondary seal.

11. The method of claim 1, wherein said base sheet includes at least a first bonding material disposed on said first mating surface and said lid sheet includes at least a second bonding material disposed on said second mating surface.

12. The method of claim 11, wherein said first bonding material comprises at least one polymeric material.

13. The method of claim 12, wherein said first bonding material comprises polyvinyl chloride.

14. The method of claim 11, wherein said first bonding material comprises heat seal lacquer.

15. The method of claim 11, wherein said second bonding material comprises at least one polymeric material.

16. The method of claim 15, wherein said second bonding material comprises polyvinyl chloride.

17. The method of claim 11, wherein said second bonding material comprises heat seal lacquer.

18. The method of claim 1, wherein said first mating surface comprises aluminum.

19. The method of claim 1, wherein said laminate assembly is substantially elongate.

20. The method of claim 19, wherein said laminate assembly comprises a plurality of blisters positioned along the length of the elongate laminate assembly, and wherein said blister has a periphery, and said laminate assembly defines an edge, and a first edge region is defined between the edge and the closest point along the periphery thereto, and said secondary seal extends substantially continuously within said first edge region along a length of said elongated laminate assembly.

21. The method of claim 1, wherein said laminate assembly is substantially circular.

22. A method of claim 1, wherein said primary seal comprises a cross-checked pattern of bonded regions separating non-bonded regions, and said secondary seal is substantially continuous and overlies a portion of the primary seal.

23. The method of claim 1, wherein said base sheet has a first structural material having a first material edge, and said lid sheet has a second structural material having a second material edge, and formation of said secondary seal results in the coupling of a portion of said first and second structural materials at said first and second material edges.

24. A method for forming a laminate assembly, comprising the steps of:
   a. providing a base sheet and a lid sheet, said base sheet having formed therein a blister pocket containing a pharmaceutical composition and comprising a first mating surface; said lid sheet comprising a second mating surface, said base and lid sheets having a primary seal formed between said first and second mating surfaces to form a primarily sealed laminate assembly,
   b. exposing a portion of said primary sealed laminate assembly to a bonding device to create a secondary seal therein,
   wherein said base sheet comprises a base metal layer, and said lid sheet comprises a lid metal layer, and said base and lid metal layers are at a first distance from each other in the region of said primary seal, and at a second distance from each other in the region of said secondary seal, and said first distance is greater than said second distance.

25. The method of claim 24, wherein said laminate assembly has a thickness, and the thickness of said laminate assembly is greater in the region of the primary seal than in the region of the secondary seal.

* * * * *